(12) United States Patent
Fuchs et al.

(10) Patent No.: US 12,511,861 B2
(45) Date of Patent: *Dec. 30, 2025

(54) DETECTION OF ANNOTATED REGIONS OF INTEREST IN IMAGES

(71) Applicant: MEMORIAL SLOAN KETTERING CANCER CENTER, New York, NY (US)

(72) Inventors: Thomas Fuchs, New York, NY (US); Peter J. Schüffler, New York, NY (US); Dig Vijay Kumar Yarlagadda, New York, NY (US); Chad Vanderbilt, New York, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,332

(22) Filed: May 11, 2023

(65) Prior Publication Data

US 2023/0360354 A1 Nov. 9, 2023

Related U.S. Application Data

(63) Continuation of application No. 17/553,291, filed on Dec. 16, 2021, now Pat. No. 11,682,186.
(Continued)

(51) Int. Cl.
*G06V 10/25* (2022.01)
*G06T 3/40* (2024.01)
(Continued)

(52) U.S. Cl.
CPC .............. *G06V 10/25* (2022.01); *G06T 3/40* (2013.01); *G06T 5/70* (2024.01); *G06T 7/0012* (2013.01);
(Continued)

(58) Field of Classification Search
CPC ............ G06V 10/25; G06V 30/18105; G06V 30/19173; G06V 30/1448; G06T 7/194;
(Continued)

(56) References Cited

U.S. PATENT DOCUMENTS

| 6,418,236 B1 | 7/2002 | Ellis et al. |
| 10,347,293 B1 | 7/2019 | Skinner et al. |

(Continued)

OTHER PUBLICATIONS

Sonal et al. NPL "Eliminating tissue-fold artifacts in histopathological whole-slide images for improved image-based prediction of cancer grade" (Year: 2013).*
(Continued)

*Primary Examiner* — Andrew W Bee
*Assistant Examiner* — Winta Gebreslassie
(74) *Attorney, Agent, or Firm* — Bookoff McAndrews, PLLC

(57) ABSTRACT

The present disclosure is directed to systems and methods for identifying regions of interest (ROIs) in images. A computing system may identify an image including an annotation defining an ROI. The image may have a plurality of pixels in a first color space. The computing system may convert the plurality of pixels from the first color space to a second color space to differentiate the annotation from the ROI. The computing system may select a first subset of pixels corresponding to the annotation based at least on a color value of the first subset of pixels in the second color space. The computing system may identify a second subset of pixels included in the ROI from the image using the first subset of pixels. The computing system may store an association between the second subset of pixels and the ROI defined by the annotation in the image.

20 Claims, 12 Drawing Sheets

Related U.S. Application Data

(60) Provisional application No. 63/126,298, filed on Dec. 16, 2020.

(51) Int. Cl.
    *G06T 5/70*          (2024.01)
    *G06T 7/00*          (2017.01)
    *G06T 7/194*         (2017.01)
    *G06V 30/14*        (2022.01)
    *G06V 30/18*        (2022.01)
    *G06V 30/19*        (2022.01)

(52) U.S. Cl.
CPC .......... *G06T 7/194* (2017.01); *G06V 30/1448* (2022.01); *G06V 30/18105* (2022.01); *G06V 30/19173* (2022.01); *G06T 2207/20081* (2013.01); *G06T 2207/30024* (2013.01)

(58) Field of Classification Search
CPC ......... G06T 3/40; G06T 5/002; G06T 7/0012; G06T 2207/20081; G06T 2207/30024
See application file for complete search history.

(56) References Cited

U.S. PATENT DOCUMENTS

| | | |
|---|---|---|
| 2015/0317509 A1 | 11/2015 | Kil |
| 2018/0225872 A1* | 8/2018 | Vink ................... G06T 7/0012 |
| 2020/0111447 A1 | 4/2020 | Yaacob et al. |
| 2020/0211189 A1 | 7/2020 | Yip et al. |
| 2020/0311483 A1 | 10/2020 | Goto et al. |
| 2021/0155982 A1* | 5/2021 | Yin ........................ G06T 7/136 |
| 2022/0156926 A1* | 5/2022 | Raharja .................. G06F 18/40 |

OTHER PUBLICATIONS

Strom et al. NPL "Pathologist-Level Grading of Prostate Biopsies with Artificial Intelligence" (Year: 2019).*
Bandi et al., Resolution-agnostic tissue segmentation in whole-slide histopathology images with convolutional neural networks. PeerJ 2019; 7:e8242-e8242. doi: 10.7717/peerj.8242.
Cohen, A Coefficient of Agreement for Nominal Scales. Educ Psychol Meas 1960;20:37-46. doi:10.1177/001316446002000104.
Dice, Measures of the Amount of Ecologic Association Between Species. Ecology 1945;26:297-302. doi:10.2307/1932409.
Goode et al., OpenSlide: A vendor-neutral software foundation for digital pathology. J Pathol Inform 2013;4:27. doi:10.4103/2153-3539.119005.
Hanna et al., Validation of a digital pathology system including remote review during the COVID-19 pandemic. Mod Path 2020;33:2115-27.
Ho et al., Deep Interactive Learning: An Efficient Labeling Approach for Deep Learning-Based Osteosarcoma Treatment Response Assessment. In: Martel AL, Abolmaesumi P, Stoyanov D, et al., eds. Medical Image Computing and Computer Assisted Intervention—MICCAI 2020. Cham: : Springer International Publishing 2020. 540-9. doi:10.1007/978-3-030-59722-1_52.
Ho et al., Deep Multi-Magnification Networks for Multi-Class Breast Cancer Image Segmentation. ArXiv191013042 Cs Eess Published Online First: Oct. 28, 2019.http://arxiv.org/abs/1910.13042 (accessed May 9, 2020).
International Search Report on PCT PCT/US2021/063837 dated Mar. 25, 2022.
Jaccard, de distribution florale dans la zone alpine. Bulletin de la Societe Vaudoise des Sciences Naturelles 1902.
Janowczyk et al., HistoQC: An Open-Source Quality Control Tool for Digital Pathology Slides. JCO Clin Cancer Inform 2019;3:1-7. doi:10.1200/CCI.18.00157.
Kothari et al., Eliminating tissue-fold artifacts in histopathological whole-slide images for improved image-based prediction of cancer grade. J Pathol Inform 2013;4:22. doi: 10.4103/2153-3539.117448.
Li et al., Deep Learning Methods for Lung Cancer Segmentation in Whole-slide Histopathology Images—the ACDC@LungHP Challenge 2019. 2020.
Mousavi et al., Automated discrimination of lower and higher grade gliomas based on histopathological image analysis. J Pathol Inform 2015;6:15. doi: 10.4103/2153-3539.153914.
Pedregosa et al., Scikit-learn: Machine Learning in Python. J Mach Learn Res 2011;12:2825-2830.
Sonal et al. "Eliminating tissue-fold artifacts in histopathological whole-slide images for improved image-based prediction of cancer grade" (Year: 2013).
Sornapudi et al., EpithNet: Deep regression for epithelium segmentation in cervical histology images. J Pathol Inform 2020;11:10. doi:10.4103/jpi.jpi_53_19.
Suzuki et al., Topological structural analysis of digitized binary images by border following. Comput Vis Graph Image Process 1985;30:32-46. doi:https://doi.org/10.1016/0734-189X(85)90016-7.
Bairavi Venkatesh et al: "Restoration of marker occluded hematoxylin and eosin stained whole slide histology images using generative adversarial networks", arxiv.org, Cornell University Library, 201 Olin Library Cornell University Ithaca, NY 14853, Oct. 14, 2019, XP081515148.
Danial Maleki et al: "Ink Marker Segmentation in Histopathology Images Using Deep Learning", arxiv.org, Cornell University Library, 201 Olin Library Cornell University Ithaca, NY 14853, Oct. 29, 2020, XP081803549.
Jiang Jun et al: "Image-to-image translation for automatic ink removal in whole slide images", Journal of medical imaging (Bellingham, Wash.), Sep. 1, 2020, pp. 1-14, XP093122629, DOI: 10.1117/1.JMI.7.5.057502. Retrieved from the Internet: URL: https://www.ncbi.nlm.nih.gov/pmc/articles/PMC7567133/pdf/ [retrieved on Jan. 23, 2024].
Peter Strom et al: "Pathologist-Level Grading of Prostate Biopsies with Artificial Intelligence", arxiv.org, Cornell University Library, 201 Olin Library Cornell University Ithaca, NY 14853, Jul. 2, 2019, XP081388627.

* cited by examiner

DETECTION OF ANNOTATED REGIONS OF INTEREST IN IMAGES

CROSS REFERENCE TO RELATED APPLICATIONS

The present application claims the benefit of priority under 35 U.S.C. 120 as a continuation of U.S. patent application Ser. No. 17/553,291, titled "Detection of Annotated Regions of Interest in Images," filed Dec. 16, 2021, which claims the benefit of priority under 35 U.S.C. 119(e) to U.S. Provisional Application No. 63/126,298, titled "Tool to Detect and Extract Pen Annotated Areas in Digital Slides Images into a Digital Format," filed Dec. 16, 2020, each of which is incorporated herein by reference in its entirety.

BACKGROUND

An image may include one or more features within. Various computer vision techniques may be used to automatically detect the features from within the image.

SUMMARY

Aspects of the present disclosure are directed to systems, methods, and computer-readable media for identifying regions of interest (ROIs) in images. A computing system may identify an image including an annotation defining an ROI. The image may have a plurality of pixels in a first color space. The computing system may convert the plurality of pixels from the first color space to a second color space to differentiate the annotation from the ROI. The computing system may select, from the plurality of pixels, a first subset of pixels corresponding to the annotation based at least on a color value of at least one of the first subset of pixels in the second color space. The computing system may identify a second subset of pixels included in the ROI from the image using the first subset of pixels. The computing system may store, in one or more data structures, an association between the second subset of pixels and the ROI defined by the annotation in the image.

In some embodiments, the computing system may provide the image identifying the second subset of pixels as the ROI to train a machine-learning model for at least one of image segmentation, image localization, or image classification. In some embodiments, the computing system may generate a mask defining for the ROI within the image based at least on the second subset of pixels and a foreground portion identified from the image.

In some embodiments, the computing system may apply a kernel to a third subset of pixels partially surrounding a fourth subset of pixels and corresponding to the annotation to select the first subset of pixels fully surrounding the fourth subset of pixel corresponding to the ROI. In some embodiments, the computing system may determine that a third subset of pixels is to be removed from identification as corresponding based at least on a number of pixels in the third subset of pixels below a threshold number of pixels for the annotation.

In some embodiments, the computing system may apply a filter to the image including the plurality of pixels in the first color space to reduce noise or differentiate a foreground portion from a background portion of the image. In some embodiments, the computing system may determine that the color value of at least one of the subset of pixels in the second color space satisfies at least one of a plurality of threshold ranges for the annotation.

In some embodiments, the computing system may extract a boundary defined by the first subset of pixels to identify the second subset of pixels surrounded by the first subset of pixels. In some embodiments, the computing system may identify the image at a first magnification level derived from a second image at a second magnification level greater than the first magnification level. In some embodiments, the image may include a biomedical image of a sample tissue on a slide via a histological image preparer. The sample tissue may have a feature corresponding to the ROI. The slide may have an indication created using a marker defining the annotation.

DETAILED DESCRIPTION

Following below are more detailed descriptions of various concepts related to, and embodiments of, systems and methods for identifying annotated regions of interest (ROI) in images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes tools to detect and extract pen annotated areas in digital slides images into digital formats.

Section B describes systems and methods for identifying marked regions of interests (ROIs) in images.

Section C describes a network environment and computing environment which may be useful for practicing various computing related embodiments described herein.

A. Tools to Detect and Extract Pen Annotated Areas in Digital Slides Images into Digital Formats The development of artificial intelligence (AI) in pathology frequently relies on digitally annotated whole slide images (WSI). The creation of these annotations—manually drawn by pathologists in digital slide viewers—is time consuming and expensive. At the same time, pathologists annotate glass slides with a pen to outline cancerous regions, e.g., for molecular assessment of the tissue. Under some approaches, these pen annotations may be considered artifacts and excluded from computational modeling.

Presented herein is an image processing pipeline which allows for: (i) the detection of pen annotations on digitized pathology slides, regardless of color (e.g., black, blue, green, purple, and red markers, among others); (ii) the segmentation of the "inner" part of the annotation, if it circumvents a region; (iii) the identification of foreground (tissue) and background (non-tissue, white area) on the slide; (iv) combination of the foreground and annotated area; and (v) export of the annotated foreground area as an "annotation mask". The annotation mask from step (v) can then be used for machine learning and computer vision pipelines.

Figure 1:
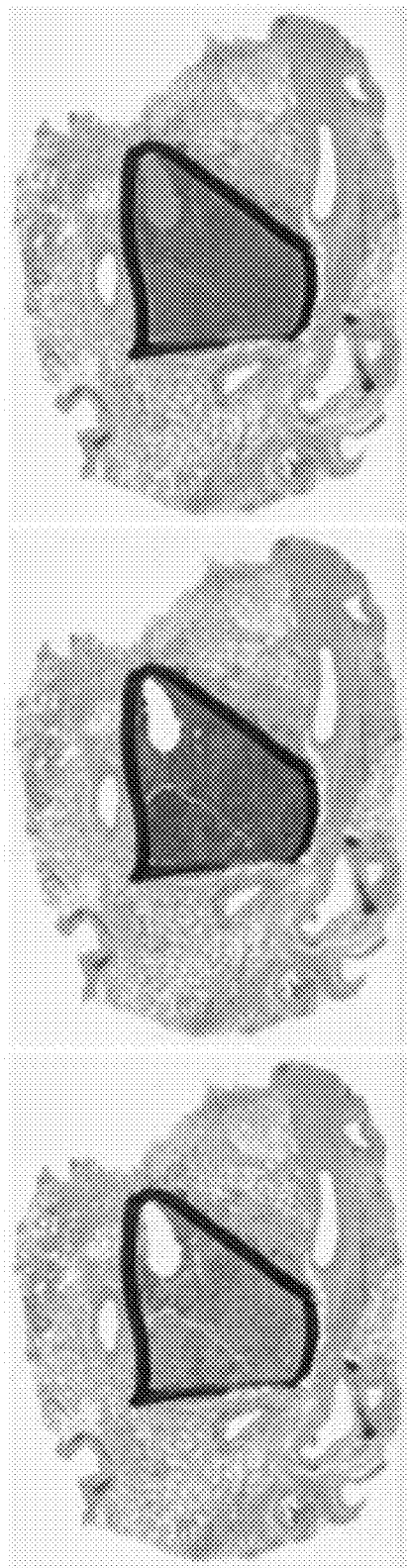
FIG. 1. Example of a digitized pen annotation. Left: the original glass slide, manually annotated by a pathologist with a pen on the glass slide (blue). Middle: Automatically identified annotated with the procedure based on the pen and tissue region. Right: For comparison manually digitally annotated region (red) with a digital tool by a pathologist. This manual digital annotation is time consuming and redundant.

Referring now to FIG. 1, from a pen-annotated pathology slide (left), the proposed pipeline is able to detect and segment the "inner" part in an electronic format (i.e., mask, middle). For comparison and alternatively, a pathologist annotates this inner part with an electronic tool to retrieve the same result (right). This manual annotation is redundant and time.

Figure 2:
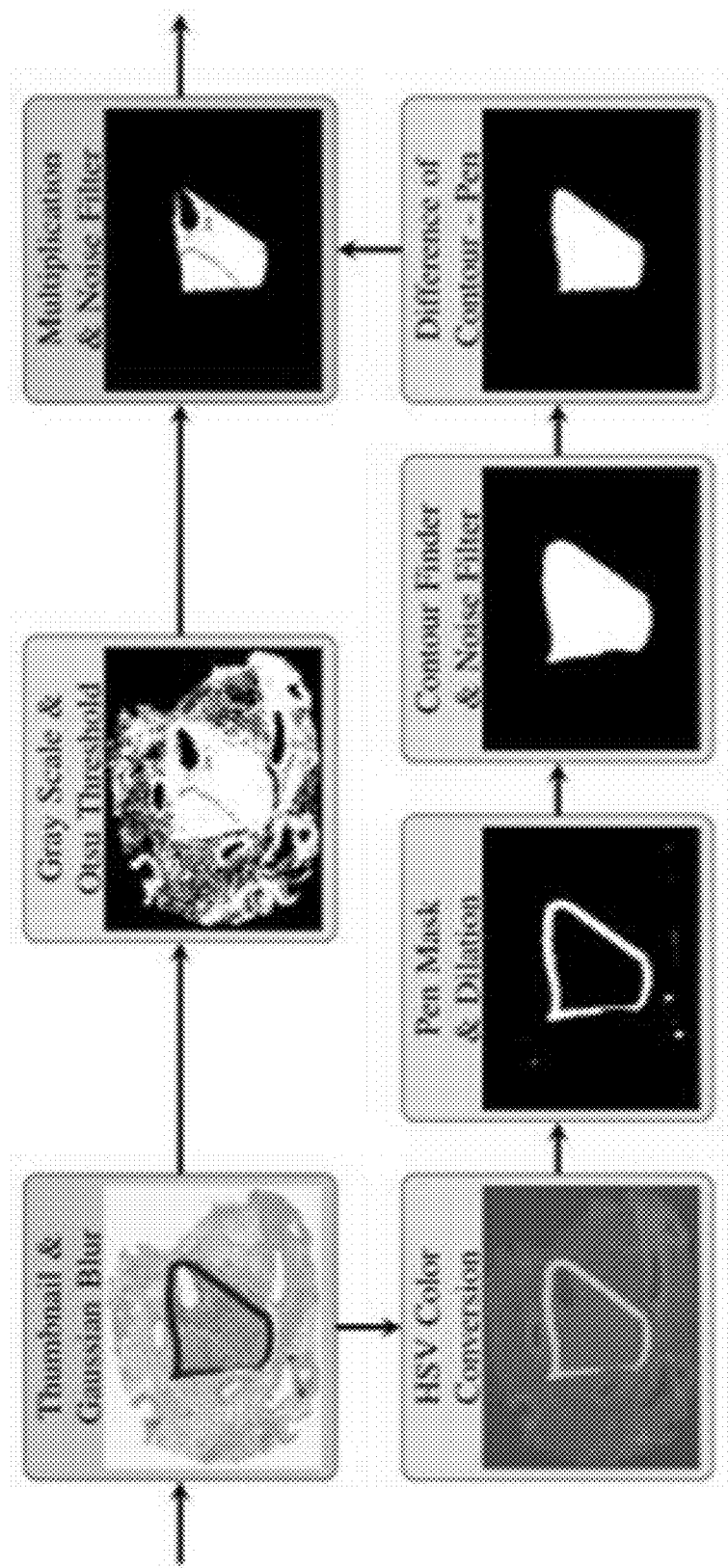
FIG. 2. Annotation extraction pipeline. Top left: As INPUT, a thumbnail of the digital pen is given. A Gaussian smooth filter is applied. Top middle: the image is gray scaled and the foreground is separated from the background using an Otsu threshold. Bottom f.l.t.r: The image is converted into the HSV color space. The pixels of the pen color are separated from the rest, and the pen outline is dilated to close small gaps. A contour filter fills closed contours identifying the "inner" regions. A noise filter removes small regions based on size. The pen mask is then subtracted from the contour mask to obtain the content of the annotated region only. Top right: the OUTPUT is a combination of the foreground mask and the annotation mask.

Referring now to FIG. 2, highlighted are the individual steps of extracting the annotation. The pipeline enables the use of numerous, already manually annotated pathology slide without the need to re-annotate them manually with electronic tools. These pen annotations typically highlight regions of cancer and thus the tool can be used to develop cancer classification models faster by providing access to more annotated data.

1. Introduction

The development of artificial intelligence (AI) in pathology frequently relies on digitally annotated whole slide images (WSI). The creation of these annotations—manually drawn by pathologists in digital slide viewers—is time consuming and expensive. At the same time, pathologists annotate glass slides with a pen to outline cancerous regions, e.g., for molecular assessment of the tissue. These pen annotations are considered artifacts under some approaches and excluded from computational modeling.

A. Methods

Proposed is a novel method to segment and fill hand-drawn pen annotations and convert them into a digital format to make them accessible for computational models. This method is implemented in Python as an open-source, publicly available software tool.

B. Results

The method is able to extract pen annotations from WSI and save them as annotation masks. On a data set of 319 WSI with pen markers, the algorithm segmenting the annotations was validated with an overall Dice metric of 0.942, Precision of 0.955, and Recall of 0.943. Processing all images takes 15 minutes in contrast to 5 hours manual digital annotation time. Further, the approach is robust against text annotations.

C. Conclusions

It is envisioned that the method can take advantage of already pen-annotated slides in scenarios in which the annotations would be helpful for training computational models. Considering the large archives of many pathology departments that are being digitized, this method will help to collect large numbers of training samples from those data.

2. Context

Algorithms in computational pathology can be trained with the help of annotated image data sets. In some scenarios, the knowledge of tumor regions on an image is beneficial, as the models are designed to learn the difference between cancerous tissue and surrounding normal tissue. A large part of the corresponding pipelines for pathology AI development is therefore the creation of annotated data sets on scanned WSI such that cancerous regions are digitally accessible. Annotations are usually acquired with the help of pathologists, drawing with digital tools on scanned whole slide images (WSI) on a computer screen. In a machine learning pipeline, generating those annotated data sets can constitute a bottleneck, since it is time consuming, cumbersome and error-prone, depending on the level of granularity of the annotations.

At the same time, many glass slides are already physically annotated by pathologists with a pen to outline tumor regions or other regions of interest. As an example, glass slides are commonly annotated for molecular assessment to outline tumor regions to be sampled for genetic analysis and sequencing. Tissue from the original paraffin-embedded specimen can hence be sampled from the same region that the pathologist indicated on the glass slide after inspecting the slide. However, these pen annotations are analog on the glass slides and not ad hoc utilizable by a digital algorithm. These hand-drawn pen annotations have yet to be digitized.

Figure 3:
FIG. 3. Example of a digitized pen annotation. Left: The original glass slide, manually annotated by a pathologist with a blue pen on the glass slide. Middle: Automatically segmented annotated region with the procedure based on the pen and tissue region. Right: For comparison: manual annotation of the digital slide (red) created with a digital tool by a pathologist. This manual digital annotation is time consuming and redundant.

In this disclosure, presented herein is a method to extract pen annotations from WSI to be able to utilize them for downstream digital processing. As illustrated in FIG. 3 with a scanned pen annotation on a WSI (left), this method extracts binary digital masks of the outlined regions (middle, blue mask). Hence, it allows us to take advantage of the annotations which have already been made from trained pathologists, reducing the need of collecting new, manually drawn annotations, such as shown in FIG. 3, right (red manually drawn digital annotation). Considering the plethora of archived image data in pathology departments, this method enables to access thousands of such hand-drawn annotations, making these annotations available for computational pathology for the first time.

Under some approaches, pen annotations on digital WSI are usually considered artifacts, disturbing downstream computational analysis as they cover or stain the underlying tissue. Therefore, research exists aiming to automatically detect and exclude pen annotations on WSI from analysis along with tissue folds, out-of-focus areas, air bubbles and other artifacts. Instead, it is proposed to make use of the already annotated glass slides and digitize the inhibited information to make it accessible to computational algorithms.

3. Methods

A. Pen Annotation Extraction

Figure 4:
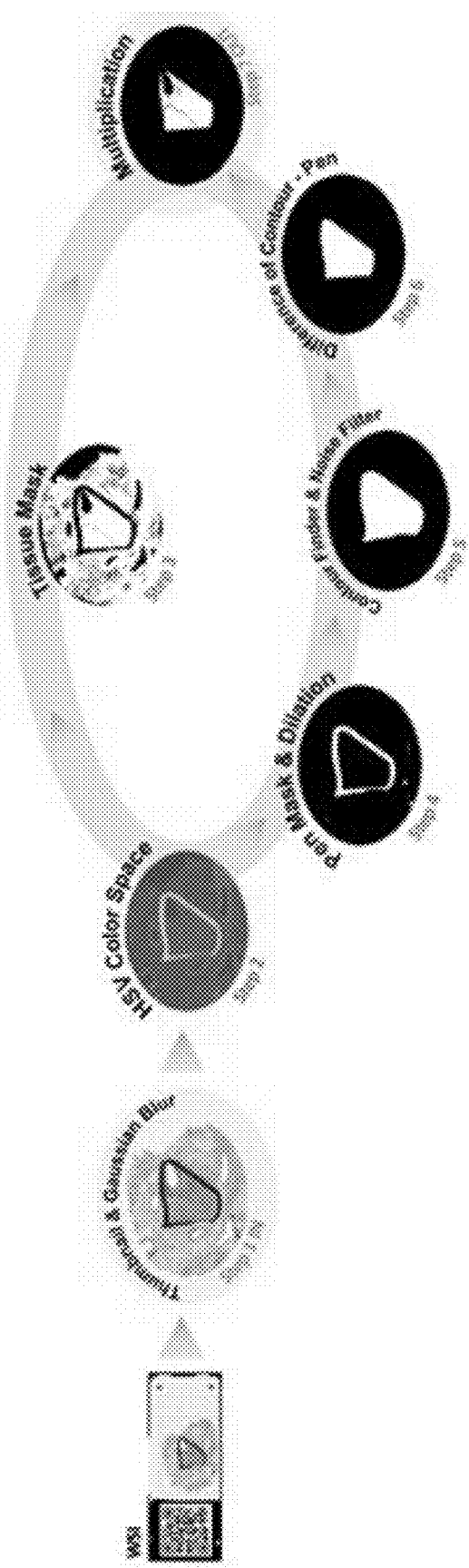
FIG. 4. Annotation extraction pipeline. Top left: From the WSI, the thumbnail needs to be extracted in an input folder. Step 1: A Gaussian smooth filter is applied on the thumbnail. Step 2: The image is converted to the HSV color space. Step 3: The tissue is separated from background using a threshold. Step 4: The pixels of the pen color are separated from the rest, and the pen outline is dilated to close small gaps. Step 5: A contour filter fills closed contours identifying the "inner" regions. A noise filter removes small regions based on size. Step 6: The pen mask is then subtracted from the contour mask to obtain the content of the annotated region only. Step 7: A multiplication of the tissue mask (step 3) and the annotation mask (step 6) forms the final output mask.

The annotation extractor is implemented as command line script in Python 3. Its input is a folder containing thumbnail images of all WSI to be processed. The thumbnails stored are extracted in WSI prior processing. The output is a different folder with detected pen annotation masks for those images, each mask with the same dimensions as the corresponding thumbnail image. Seven processing steps compose the workflow for every thumbnail image in the input folder as illustrated in FIG. 4.

In step 1, a Gaussian blur filter with radius 3 is applied on the thumbnail image to reduce unspecific noise. In step 2, the blurred image is converted to the HSV (Hue, Saturation, Value) color space. The HSV color space is used as it was found that the RGB color space is not robust enough to detect all variations introduced during staining and scanning. Further, HSV is more suitable to separate the markers by addressing the raw luminance values. The HSV image is used in step 3 to mask the tissue with H&E-related color thresholds. Pixel values between [135, 10, 30] and [170, 255, 255] are considered tissue without pen.

In step 4, pen-stroke masks are extracted from the HSV image based on pen color related thresholds. This data set comprises three pen colors: black, blue, and green. Pixel values between [0, 0, 0] and [180, 255, 125] are considered to originate from black pen. Pixel values between [100, 125, 30] and [130, 255, 255] are considered to originate from blue pen. And pixel values between [40, 125, 30] and [70, 255, 255] are considered to originate from green pen. These HSV values describe a spectrum of the corresponding colors and have worked well for us to capture the pen-annotated pixels.

As no differentiation between the pen colors is performed, the three individual color masks are joined to the overall pen mask. Note that, to add other pen colors, one would have to add their specific color thresholds as an extension of this method.

To close gaps in the annotated pen contours, a morphologic dilation with a circular kernel is employed on the overall pen mask. The dilation thickens the contours of the pen by the given kernel size and thus closes holes in the mask. This step is needed to account for thin pen lines and for small gaps in the drawn lines, e.g., at almost closed ends of a circle. The larger the gaps are, the larger the kernel size has to be in order to close the shape. This algorithm is run in four rounds with increasing kernel size of 5, 10, 15, and 20 pixels. In each round, pen annotations with too large gaps will result in empty masks (as the closed contour in the next step cannot be found), and those images are subjected to the next run with larger kernel size.

In step 5, the dilated mask is subject to contour extraction and filling. To reduce noise in the filled contours, components smaller than 3,000 pixels are filtered. This threshold was chosen as it worked best on the data set by filtering small regions such as unrelated pixels, small contours, and text regions while letting tissue annotations pass. However, proposed is to explore variable filter sizes based on thumbnail dimension and resolution. The resulting mask is then subtracted in step 6 from the filled contour mask to preserve only the inner regions.

In step 6, the inner region mask is multiplied with the tissue mask to exclude background regions which are not tissue. The noise filter is applied again to remove small regions introduced at the annotation mask generation, resulting in the final mask of the pen annotated region.

Note that if there was no pen annotation on a slide in the first place, the final pen annotation mask will be empty.

B. Validation Data Set and Manual Annotations

To evaluate the method, WSI with pen markers, scanned with an Aperio AT2 scanner (Leica Biosystems, Buffalo Grove, Illinois, USA), are utilized. The WSI have been manually annotated by a pathologist using an in-house developed digital slide viewer on a Microsoft Surface Studio with a digital pen as input device. The pathologist sketched the inner regions of the visible pen markers on the full WSI. Note that the pathologist can use any magnification level in the viewer to annotate the WSI. When the pen shape is coarse, the digital manual annotation was done on a low magnification level of the WSI. When the pen shape is fine or narrow, the pathologist zoomed in to higher magnification levels to annotate the WSI. In any case, the digital annotation mask is saved by the viewer internally at the original dimension of the WSI. The manual annotations were then downscaled to the size of the thumbnail images.

To assess the performance of the method, the four similarity metrics are calculated (e.g., Dice coefficient (or F-Score), Jaccard index (or Intersection over Union (IoU)), Precision, Recall, and Cohen's Kappa between an automatically generated annotation mask A and a manually drawn annotation mask M):

$$\text{Dice} = \frac{2 * |A \cap M|}{|A| + |M|} = F_{score}$$

$$\text{Jaccard} = \frac{|A \cap M|}{|A \cup M|} = IoU$$

$$\text{Precision} = \frac{|A \cap M|}{|A|}$$

$$\text{Recall} = \frac{|A \cap M|}{|M|}$$

$$\text{Kappa} = \frac{p_0 - p_e}{1 - p_e}$$

where $p_0$ is the probability of agreement on the label assigned to a pixel, and $p_e$ is the expected agreement if both annotations are assigned randomly. All metrics were calculated using the Scikit-learn package in Python. Although these metrics are similar, they highlight slightly different aspects. Dice and Jaccard express the relative amount of overlap between automatic and manually segmented regions. Precision expresses the ability to exclude areas which do not have pen annotations. Recall quantifies the ability to include regions with pen annotations. The Kappa value expresses the agreement between automatic and manually segmented regions as a probability. All values except Kappa range between 0 (poor automatic segmentation) and 1 (perfect automatic segmentation). Kappa values range between −1 and 1, with 0 meaning no agreement between manual and automatic segmentation better than chance level, and 1 and −1 meaning perfect agreement or disagreement, respectively.

4. Results

Figure 5:
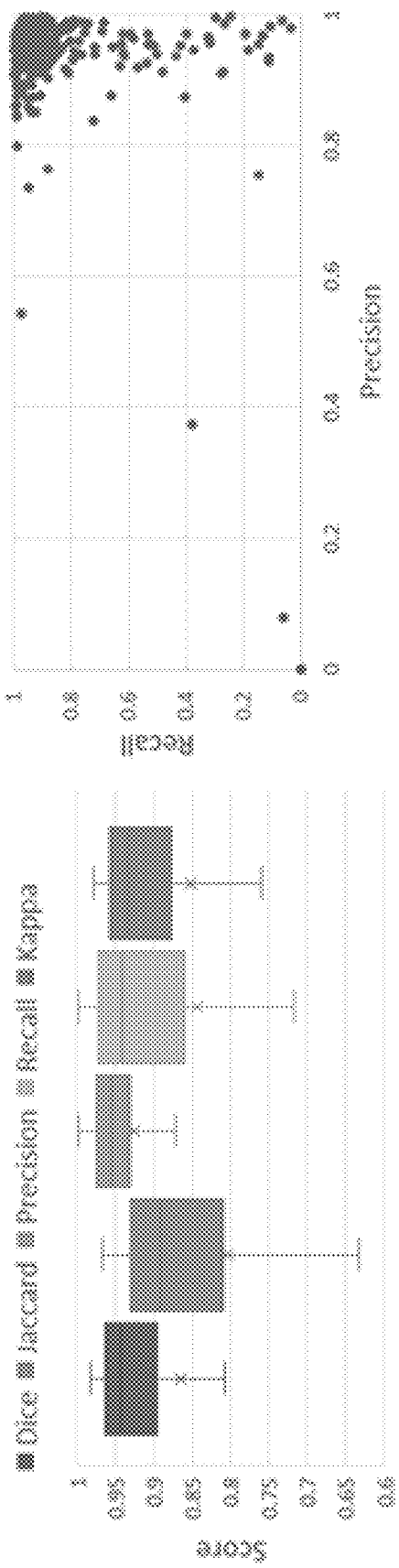
FIG. 5. Performance metrics for the proposed annotation extraction method. Left: Dice coefficient (median=0.942), Jaccard index (median=0.891), Precision (median=0.955), Recall (median=0.943) and Kappa (median=0.932) of the automatically segmented annotated regions compared to the masks which were manually drawn by a pathologist. Right: Precision/Recall curve of automatically generated and manually drawn annotation masks. All measures are calculated pixel-wise. N=319.

The similarities of the automatic segmentations to the manual drawings in a data set of 319 WSI are quantified. The thumbnails of the WSI have width of 485-1024 px (median=1024 px) and height of 382-768 px (median=749 px). As shown in FIG. 5, left, and Table 1, the median Dice coefficient between the automatically segmented and manual pen masks is 0.942 (mean 0.865±0.207), the median Jaccard index is 0.891 (mean 0.803±0.227), the median Precision is 0.955 (mean 0.926±0.148), the median Recall is 0.943 (mean 0.844±0.237), and the median Kappa value is 0.932 (mean 0.852±0.216). FIG. 5, right, sketches a Precision/Recall curve describing the data set. Note that the Precision is generally very high (>0.90), while the Recall distributes over a larger range with a median of 0.943, meaning that some manual annotations are missed. The extreme outliers with zero Precision and Recall indicate disjointed annotations and are discussed in the next section.

Figure 6:
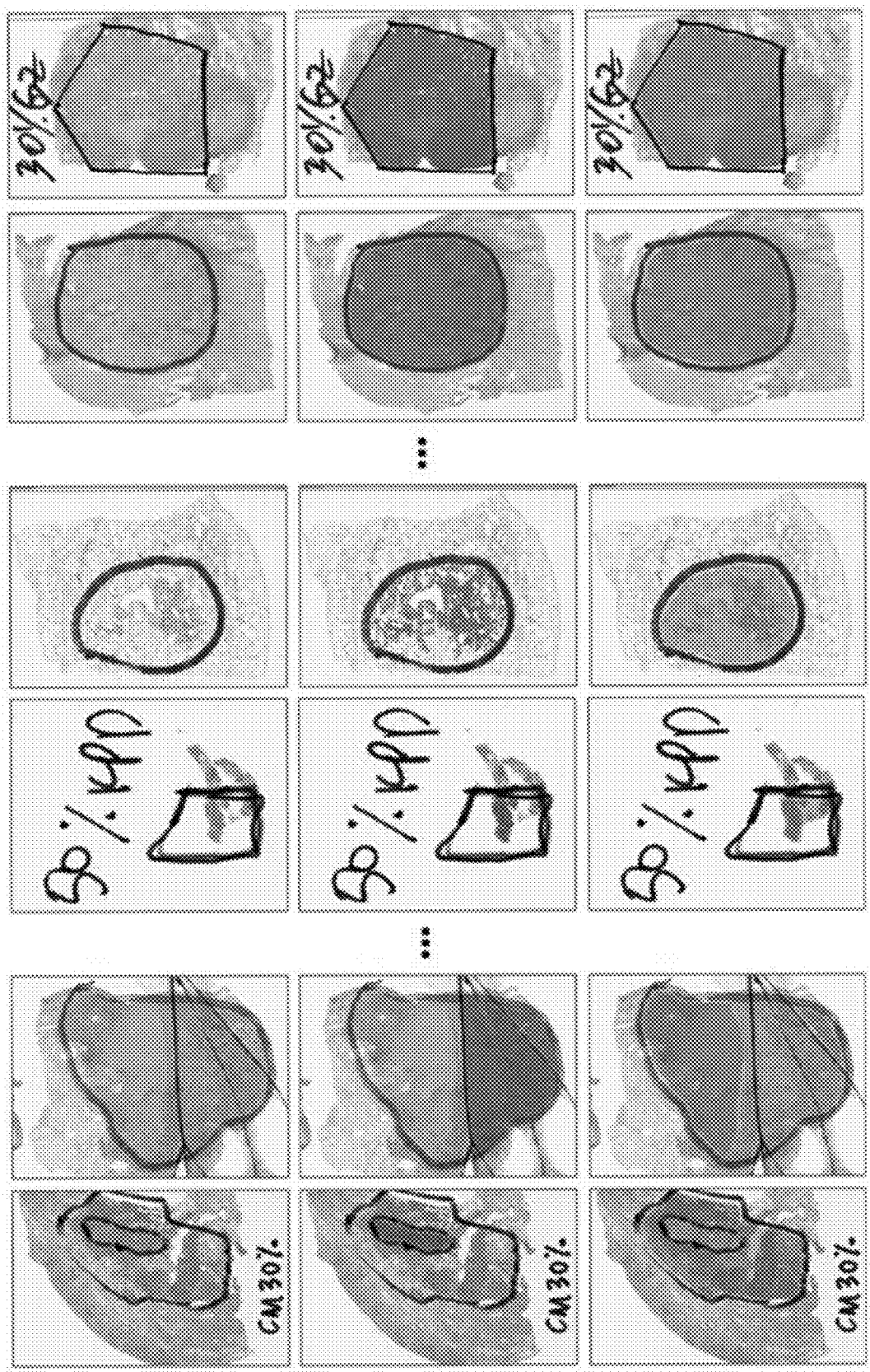
FIG. 6: Examples of two high-scored extractions (top, Dice 0.983 and 0.981), two medium-scored (middle, 0.755 and 0.728), and two low-scored extractions (bottom, 0.070 and 0). Left: Original image. The annotations are drawn with a pen on the glass slide. Middle: Automatically segmented annotations. Right: Manually segmented annotations. Note that this method can differentiate between text and tissue outlines. The medium-scored annotations in general show good segmentations, but their scores are lowered due to sparse tissue and coarse manual digital annotation. The two low-scored examples are difficult due to a broken cover slip, or due to a ring-shaped pen annotation.

FIG. 6 illustrates two examples with high scores (Dice 0.983 and 0.981, top), two examples with medium scores (0.755 and 0.728, middle), and two examples with low scores (0.070 and 0, bottom). The easiest annotations are those with closed shapes such as circles or polygons. Still, even if the annotation is easy to process by the method, the score can be lowered if the tissue within the annotation is sparse while the manual digital annotation is coarse, as illustrated in the two medium examples. Difficult annotations for the method are shapes that are not closed and therefore cannot be filled, slides with artifacts such as broken cover slips (FIG. 6 second from bottom), or complex annotations such as ring-shaped objects (FIG. 6 bottom). These difficult cases are outliers in the data set, as indicated by the statistics in FIG. 5.

An interesting observation is that text annotations are robustly ignored throughout all samples by the method, as illustrated in FIG. 6 top. This is achieved by the size-based noise filter that removes small closed areas in roundish letters. A specific text recognition program is not incorporated.

A. Annotation Time

The time needed for manual digital coarse annotations on all WSI was approximately 5 hours, with an average of 1 minute per slide.

In contrast, the method runs in 15 minutes for all slides after finalizing all parameters. Note that images are being processed in sequence and the script can further be optimized with parallel processing. It is therefore proposed to use the method to extract available, coarse annotations.

Note that this comparison has limitations. While the pathologist can annotate in the viewer at any magnification level, e.g., to account for fine-grained sections, the method runs solely on thumbnails without any option for fine-grained annotations. Further, the time needed to annotate the glass slides itself with a pen is not known and thus a comparison between pen annotation time with manual digital annotation time cannot be done.

B. Conclusion

Whole slide images can contain analog, hand-drawn pen annotations from pathologists. These annotations are commonly used to coarsely outline cancerous areas subject to molecular follow-up or genetic sequencing. Therefore, these annotations can be very valuable for various cancer classification models in computational pathology. However, pen annotations are usually considered as unwanted image artifacts and are aimed to be excluded from analysis. Instead, the scenario in which these annotations would be beneficial for the classifier if they could be accessed by the algorithm is considered. For this, presented herein is a tool that allows for the digital extraction of the inner part of hand-drawn pen annotations. The method identifies and segments the pen regions, closes the contours and fills them, and finally exports the obtained mask.

The performance of the algorithm has been assessed on a pen-annotated data set of 319 WSI, resulting in an overall Dice metric of 0.942 and overall Precision and Recall of 0.955 and 0.943, respectively. Most suitable pen shapes are closed areas as they are easily extractable by the method. However, problematic pen annotations include shapes that are improperly closed or complex by nature (e.g., with holes in them middle). Improperly closed shapes can be addressed with manual adjustments of the dilution radius. More complex shapes such as doughnut-shaped annotations would require further improvements of the method.

In general, the approach can be extended to other data sets, for example, to process WSI with a different staining from hematoxylin and eosin (H&E) (e.g., hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain), or to account for more pen colors. It is not a fully automatic pen-annotation extraction method, since it needs potential adjustments of the used parameters. Still, it is shown that it is able to capture a bulk part of common annotations which would need much more time to draw manually. Further, guidance to fine tune potential parameters is provided.

Pen annotations can be very diverse and might have various meanings. The method appeared to be robust against text, possibly since text does not contain large closed shapes and is typically on the white background and not the tissue. Further, it appeared to work best on simple, closed shapes.

However, pen annotations can be very imprecise since they are drawn on the glass directly, which can be a limitation. It is almost impossible to outline the exact boarder of cancerous regions without any magnification. It has to be kept in mind that using the tool to extract the annotations will lead to digital regions at the same precision.

We conclude that a primary use case for the method can be the gathering of enriched tumor samples for training or fine tuning of pathology AI in scenarios in which pen-annotated tumor regions are available.

Tables and Captions

TABLE 1

Statistical summary of the similarity metrics comparing the automatically segmented annotations with the manual annotations.

| n = 319 | Dice | Jaccard | Precision | Recall | Kappa |
|---|---|---|---|---|---|
| mean | 0.865 | 0.803 | 0.926 | 0.844 | 0.852 |
| std | 0.207 | 0.227 | 0.148 | 0.237 | 0.216 |
| min | 0 | 0 | 0 | 0 | −0.143 |
| 25% | 0.896 | 0.812 | 0.931 | 0.860 | 0.879 |
| 50% | 0.942 | 0.891 | 0.955 | 0.943 | 0.932 |
| 75% | 0.964 | 0.931 | 0.975 | 0.972 | 0.958 |
| max | 0.983 | 0.967 | 0.999 | 0.998 | 0.979 |

B. Systems and Methods for Identifying Marked Regions of Interests (RoIs) in Images Pathologists sometimes draw with a pen on glass slides to outline a tumorous region. After scanning the slide, the pen annotation is scanned with the slide. However, for machine learning or computer vision, the "inside" and the "outside" of these annotations has to be assessed, which is not trivial. Therefore, pathologists annotate the slide again with a digital tool, which is redundant and time consuming. Presented herein is a computer-implemented tool which is able to: detect pen annotations on digital slide images, identify the "inside" region (the outlined tumor region), and export this region in a digital format such that it is accessible for other, computational analysis.

Figure 7:
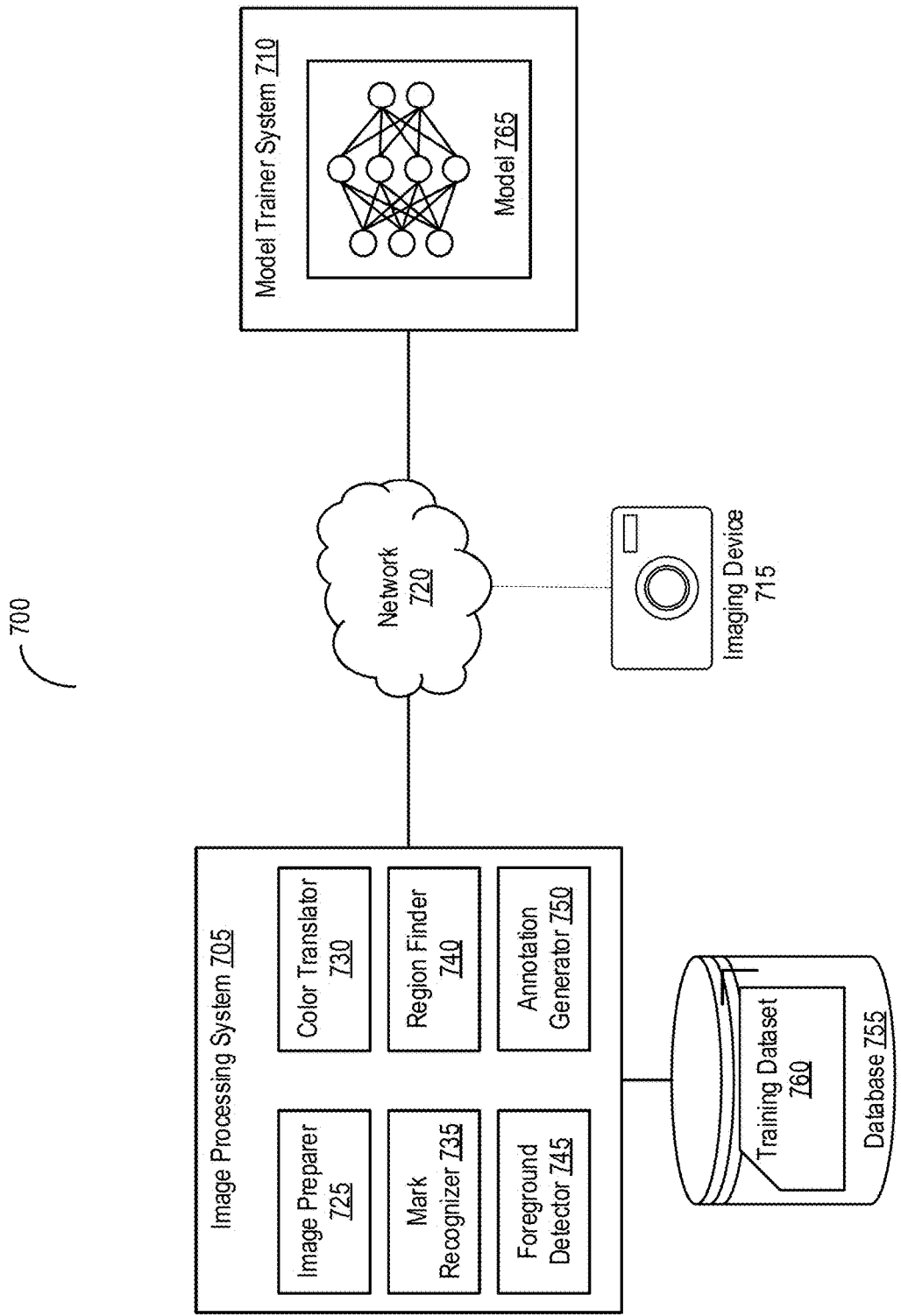
FIG. 7 depicts a block diagram of a system for identifying regions of interest (ROIs) in images, in accordance with an illustrative embodiment.

Referring now to FIG. 7, depicted is a block diagram of a system 700 for identifying regions of interest (ROIs) in images. In overview, the system 700 may include at least one image processing system 705 (sometimes herein referred to as a computing system), at least one model trainer system 710, and at least one imaging device 715. The components of the system 700 may be communicatively coupled with one another via at least one network 720. The image processing system 705 may include at least one image prepper 725, at least one color translator 730, at least one mark recognizer 735, at least one region finder 740, at least one foreground detector 745, at least one annotation generator 750, and at least one database 755, among others. The database 755 may have at least one training dataset 760. The model trainer system 710 may have at least one model 765. Each of the components in the system 700 (e.g., the image processing system 705 and its subcomponents and model trainer system 710 and its subcomponents) may be executed, processed, or implemented using hardware or a combination of hardware and software, such as the system 1000 detailed herein in Section C.

Figure 8A:
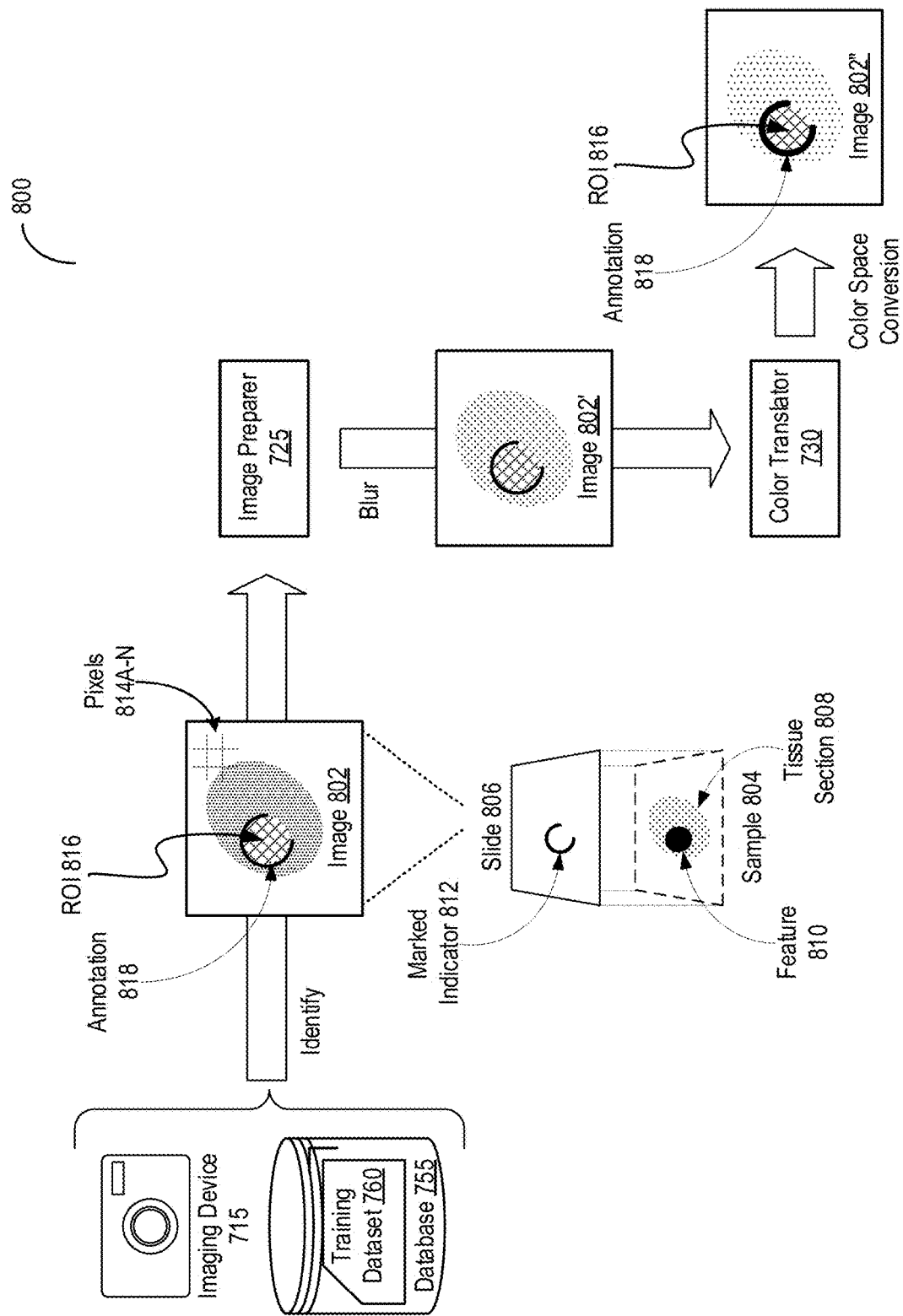
FIG. 8A depicts a block diagram of a process for converting color spaces of images in the system for identifying ROIs, in accordance with an illustrative embodiment.

Referring now to FIG. 8A, among others, depicted is a block diagram of a process 800 for converting color spaces of images in the system for identifying ROIs. The process 800 may correspond to operations performed in the system 700 to prepare images and convert color spaces. Under the process 800, the image preparer 725 executing on the image processing system 700 may retrieve, receive, or otherwise identify at least one image 802 from which to detect or identify ROIs. In some embodiments, the image preparer 725 may retrieve or receive the image 802 acquired via the imaging device 715. The imaging device 715 may acquire or generate the image 802 to send to the image processing system 705. The acquisition of the image 802 by the imaging device 715 may be in accordance with a microscopy technique at any magnification factor (e.g., 2×, 4×, 10×, or 25×). For example, the imaging device 715 may be a histopathological image preparer, such as using an optical microscope, a confocal microscope, a fluorescence microscope, a phosphorescence microscope, an electron microscope, among others. In some embodiments, the image preparer 725 may access the database 755 to fetch or identify the training dataset 760. The training dataset 760 may include information to be used to train the model 765 on the model trainer system 710, and may identify of include the image 802 acquired in a similar manner as with the imaging device 715. From the training dataset 760, the image preparer 725 may extract or identify the image 802. The image 802 may be in the maintained and stored in the form of a file (e.g., with an BMP, TIFF, or PNG, among others).

In some embodiments, the image preparer 725 may generate or identify the image 802 at a magnification factor different from the magnification factor of the original image. The original image may be acquired via the imaging device 715 or retrieved from the training dataset 760 maintained on the database 755. For example, the image preparer 725 may generate a thumbnail of the original image as the image 802 to feed to the other components of the image processing system 705. The thumbnail may be at a rescaled version of the original image, with dimensions ranging from 2 to 500 times less than those of the original image. The reduction in magnification factor or scale may facilitate faster processing of the image 802. In some embodiments, the image 802 provided from the imaging device 715 or in the training dataset 760 on the database 755 may already be at the magnification factor different from the original image. In some embodiments, with the identification of the original image, the image preparer 725 may generate the image 802 at the magnification factor (e.g., using dimension reduction or rescaling).

The image 802 may be any type of image, such as a biomedical image. While discussed primarily herein as a biomedical image, the image 802 may be any type of image in any modality. In some embodiments, the biomedical image for the image 802 may be derived from at least one sample 804 on at least one slide 806. For example, the image 802 may be a whole slide image (WSI) for digital pathology of a sample tissue corresponding to the sample 804 on the slide 806. The sample 804 may be placed, located, or otherwise situated on one side of the slide 806. The slide 806 may be comprised of any material (e.g., a glass, metal, or plastic) to hold, contain, or otherwise situate the sample 804. For example, the slide 806 may be a microscope slide for holding the sample 804 along one side.

On the slide 806, the sample 804 may include at least one tissue section 808 (or other biological material). The tissue section 808 may be from any part of a subject, such as a human, animal, or plant, among others. The tissue section 808 may be stained to facilitate imaging. For example, the tissue section 808 may be a histological section with a hematoxylin and eosin (H&E) stain, Gram stain, endospore stain, Ziehl-Neelsen stain, a Silver stain, or a Sudan state, among others. The tissue section 808 may include at least one feature 810. The feature 810 may correspond to a portion of the tissue section 808 with a particular condition or otherwise of interest. The conditions may correspond to various histopathological characteristics, such as lesions or tumors (e.g., carcinoma tissue, benign epithelial tissue, stroma tissue, necrotic tissue, and adipose tissue) within tissue section 808 of the sample 804.

In addition, the slide 806 may have at least one marked indicator 812 (sometimes herein referred to as a pen mark or an annotation). The marked indicator 812 may be a mark to indicate or label a region or area corresponding to the feature 810 within the tissue section 808 of the sample 804. The marked indicator 812 may at least partially enclose, bound, or otherwise surround the area corresponding to the feature 810 within the tissue section 808. The marked indicator 812 may substantially surround (e.g., at least 80%) or fully surround the area corresponding to the feature 810. The marked indicator 812 may be manually prepared by a viewer examining the sample 804 (or the image 802) for conditions within the tissue section 808. For example, a clinician (e.g., a pathologist) examining the sample 804 may manually draw a line partially around the area of the feature 810 within the tissue section 808 using a pen or marker. The line drawn by the clinician may correspond to the marked indicator 812. The marked indicator 812 may be of any color, such as red, blue, green, or black, among others. The color of the marked indicator 812 may differ from the colors of the tissue section 808, the feature 810, and the remainder of the sample 804 or slide 806. In some embodiments, the marked indicator 812 may be on the opposite side of the slide 806 as the tissue section 808 of the sample 804. In some embodiments, the marked indicator 812 may be on the same side of the slide 806 as the tissue section 808 of the sample 804. In addition, the slide 806 may have extraneous marks created using the pen or marker as with the marked indicator 812. The extraneous marks may be located on the slide 806 away from the marked indicator 812.

The image 802 may have a set of pixels 814A-N (hereinafter referred to as pixels 814). Each pixel 814 may correspond to a portion or element in the image 802. The pixels 814 of the image 802 may be arranged in two-dimensions (e.g., as depicted) or three-dimensions. The image 802 may correspond to a single sampling (e.g., a snapshot) or at least one frame image of a video. The color values for the pixels 814 of the image 802 may be in accordance with a color space. The color space may specify, identify, or define an organization, range, or palette of color values for pixels 814 within the image 802. The initial color space for the pixels 814 of the image 802 may be the original color space as when acquired, such as: red, green, blue (RGB) color model; cyan, magenta, yellow, and key (CMYK) color model; and YCbCr color model, among others. The color value in each pixel 814 may correspond to the color of a corresponding sampled portion the sample 804.

The image 802 may have at least one region of interest (ROI) 816. The ROI 816 may correspond to areas, sections, or volumes within the image 802 that contain, encompass, or include various features of objects within the image 802. In relation to the sample 804, the ROI 816 may correspond to the feature 810 of the tissue section 808. In relation to the pixels 814, the ROI 816 may correspond to color values in the pixels 814 indicative of the feature 810 in the tissue section 808. In addition, the image 802 may have at least one annotation 818. The annotation 818 may correspond to enclosure, boundary, or a contour at least partially enclosing the ROI 816. The annotation 818 may substantially (e.g., by at least 80%) or fully surround the ROI 816 on the image 802. In relation to the sample 804, the annotation 818 may correspond to the marked indicator 812 on the slide 806 indicating the feature 810 in the tissue section 808. In relation to the pixels 814, the annotation 818 may correspond to color values in the pixels 814 indicative of the marked indicator 812. The pixel locations of the ROI 816 and the annotation 818 may be unknown to or unidentified by the image processing system 705, prior to processing through the various components therein.

With the identification, the image preparer 725 may perform one or more pre-processing operations to format, arrange, or otherwise modify the image 802 to generate at least one image 802' feed to the other components of the image processing system 705. In some embodiments, the image preparer 725 may apply at least one filter the image 802 to generate the image 802'. The filter may be to denoise, smoothen, or blur the image 802. The filter may be, for example, a denoising function (e.g., total variation denoising or wavelet denoising) or a blur filter (e.g., Gaussian blur, Anisotropic diffusion, or bilateral filter), among others, or any combination thereof. In applying, the image preparer 725 may feed the image 802 into the filter to product or output the image 802'. Due to the filter operation, the color values of the pixels 814 in image 802' may differ from the original color values of the pixels 814 in the image 802. As a result, the image 802' may have less noise than the image 802. In addition, the foreground portion in the image 802' may be more differentiated from the background portion of the image 802', relative to the corresponding foreground and background portion in the image 802.

The color translator 730 executing on the image processing system 700 may transform, translate, or otherwise convert the pixels 814 in the image 802' from the initial color space to a different color space to produce, output, or generate an image 802". The new color space may be to differentiate the annotation 818 from the ROI 816 in the image 802". In general, the new color space may alter the color values for the pixels 814 corresponding to the annotation 818 to intensify or increase the color difference from the color values for the pixels 814 corresponding to the ROI 816 in the image 802'. The color difference may correspond to a distance between the two sets of color values in the pixels 814 for the annotation 814 and the pixels 814 for the ROI 816. The new color space may be, for example: hue, saturation, lightness (HSL) color model; hue, saturation, value (HSV) color model; or hue, chroma, luminance (HCL) color model, among others. The color values of the pixels 814 in the image 802" may be in accordance with the new color space.

In converting, the color translator 730 may apply or use a color mapping to assign new color values of the pixels 814 based on the original color values of the pixels 814 in the image 802'. The color mapping may specify, identify, or define a color value in the new color space (e.g., HSV) for each corresponding color value in the original color space (e.g., RGB). The color translator 730 may traverse through the set of pixels 814 of the image 802'. For each pixel 814, the color translator 730 may identify the color value of the pixel 814 in the original color space. The color translator 730 may identify the new color value from the color mapping for the identified color value. With the identification, the color translator 730 may set or assign the new color value to the pixel 814 in the image 802" corresponding (e.g., at the same location) to the pixel 814 in the image 802'. The color translator 730 may repeat the process of identifying and assigning through the set of pixels 814 in the image 802' to produce the image 802". Upon completion, the color translator 730 may provide the image 802" with pixels 814 in the new color space for processing by other components in the image processing system 705.

Figure 8B:
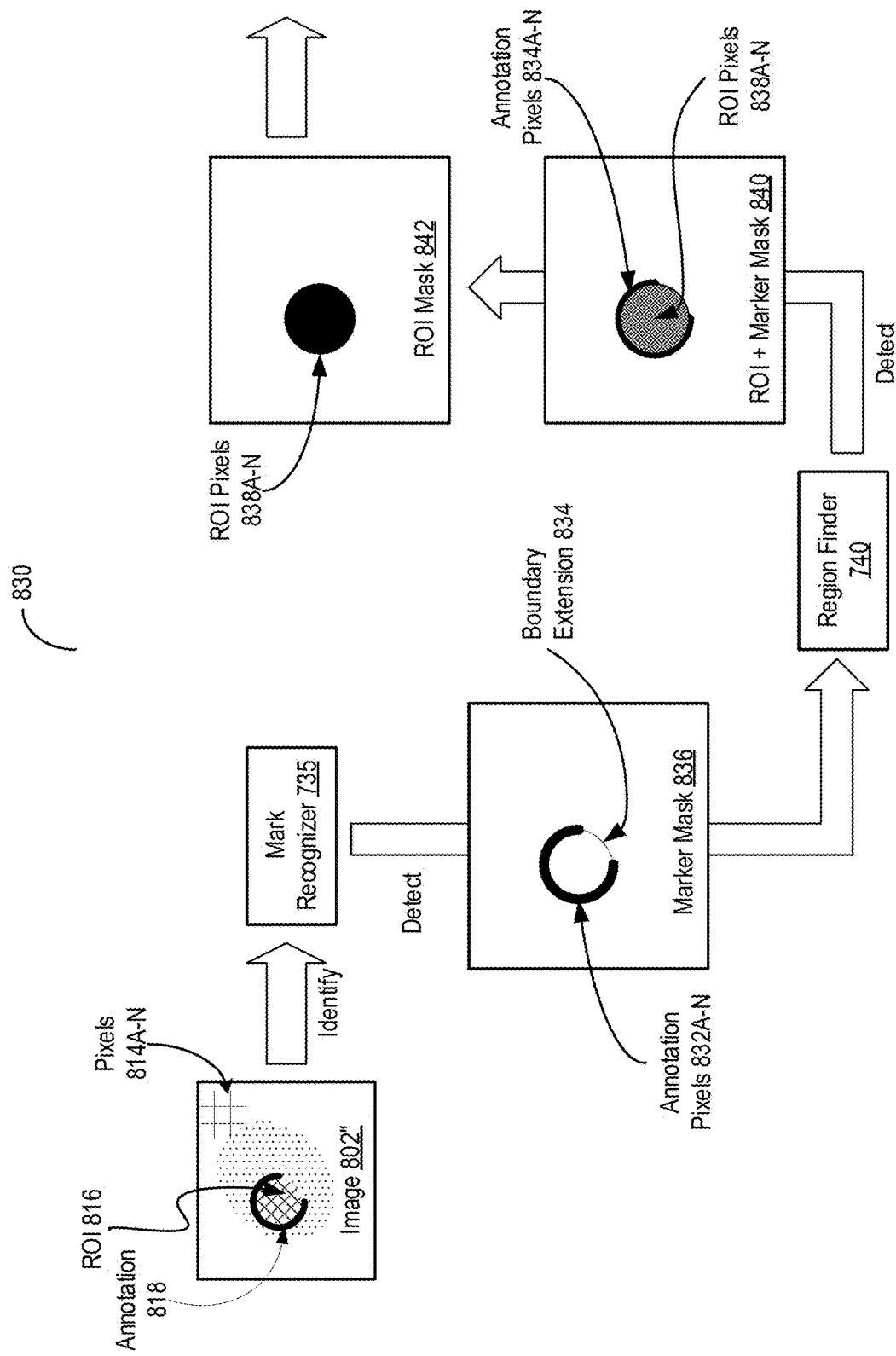
FIG. 8B depicts a block diagram of a process for deriving ROI masks in the system for identifying ROIs in accordance with an illustrative embodiment.

Referring now to FIG. 8B, among others, depicted is a block diagram of a process 830 for deriving ROI masks in the system 700 for identifying ROIs. The process 830 may correspond to operations performed in the system 700 to detect the annotation 818 and ROI 816 from the image 802". Under the process 830, the mark recognizer 735 executing on the image processing system 705 may detect, determine, or otherwise select a set of annotation pixels 832A-N (hereinafter generally referred to as annotation pixels 832) from the set of pixels 814 of the image 802". The set of annotation pixels 832 may identify a subset from the total set of pixels 814 corresponding to the annotation 818. The set of annotation pixels 832 may also initially include an extraneous mark created using a marker as with the marked indicator 812. The selection of the annotation pixels 832 may be based on the color values in one or more of the pixels 814 in the converted color space. The annotation pixels 832 may be used to surround, bound, or otherwise define the pixel locations of ROI 816 within the image 802".

To select, the mark recognizer 735 may compare the color value of each pixel 814 in the image 802" to one or more threshold ranges for marked indicator 812 in the sample 806 or the annotation 818 in the image 802". The threshold ranges may be set based on color values associated with the marked indicator 812 on the slide. As discussed above, the marked indicator 812 may be generated by a viewer (e.g., a clinician) using a marker on the slide 806. The color for the marked indicator 812 may be of certain color values (e.g., red, blue, green, or black) different from the tissue section 808, the feature 810, or the remainder of the sample 804 or slide 806. Within the new color space, the color values of the pixels 814 corresponding to the marked indicator 812 may be further differentiated from the color values of the pixels 814 corresponding to the ROI 816 and the remainder of the image 802". Each threshold range to which to compare the color values of the pixels 814 may correspond to one of the color values associated with the marked indicator 812. The threshold range may be defined within the new color space. For example, the threshold range for a black pen may be between [0, 0, 0] and [180, 255, 125], for a blue pen may be between [100, 125, 30] and [130, 255, and 255], and for a green pen may be between [40, 125, 30] and [70, 255, 255] in the HSV color space.

Based on the comparison, the mark recognizer 735 may determine whether the pixel 814 in the image 802" is to be included or selected as one of the annotation pixels 832. In comparing, the mark recognizer 735 may traverse through the set of pixels 814 in the image 802". For each pixel 814, the mark recognizer 735 may identify the color value in the converted color space (e.g., HSV value). With the identification, the mark recognizer 735 may determine whether the color value is within at least one of the threshold ranges for the annotation 818. If the color value is within at least one of the threshold ranges, the mark recognizer 735 may determine that the pixel 814 is part of the annotation pixels 832. In some embodiments, the mark recognizer 735 may select the pixel 814 to include in the annotation pixels 832. On the other hand, if the color value is outside all the threshold ranges, the mark recognizer 735 may determine that the pixel 814 is not part of the annotation pixels 832. In some embodiments, the mark recognizer 735 may exclude the pixel 814 from the annotation pixels 832. The mark recognizer 735 may repeat the comparison and selection process through the set of pixels 814 in the image 802".

In some embodiments, the mark recognizer 735 may determine or generate at least one boundary extension 834 for the annotation pixels 832. The boundary extension 834 may correspond to additional pixels 814 to include as part of the annotation pixels 832 to define or envelop the ROI 816. As described above, the annotation 818 may sometimes partially bound or surround the ROI 816 within the image 802". The boundary extension 834 may be generated by the mark recognizer 735 to dilate, expand, or otherwise increase the annotation pixels 832 to fully define or bound the ROI 816. In some embodiments, the mark recognizer 735 may use or apply at least one kernel (or filter, or function) to at least the annotation pixels 832 to generate the boundary extension 834. The kernel may define that the color value in the annotation pixel 832 is to be assigned to a number of adjacent pixels 814 in the image 802" defined by a size of the kernel. For example, the kernel may be a circular filter with a pixel size of 5×5, 10×10, ×15, or 20×20 to expand the color values of the annotation pixels 832 to the adjacent pixels 814. The mark recognizer 735 may traverse through the annotation pixels 832 to apply the kernel. In applying, the mark recognizer 735 may increase or expand the number of adjacent pixels in accordance with the kernel to include as part of the annotation pixels 832.

With the application of the kernel, the mark recognizer 735 may determine whether the annotation pixels 832 fully bound or surround a portion of the image 802". If the annotation pixels 832 fully bound the ROI 818, the image 802" may be divided into at least two portions: one portion within the bounds of the annotation pixels 832 and corresponding to the ROI 816; and another portion outside the bounds of the annotation pixels 832 corresponding to the remainder of the image 802". The mark recognizer 735 may divide, partition, or otherwise identify portions of the image 802" using the annotation pixels 832. If there is at least one portion bounded by the annotation pixels 832, the mark recognizer 735 may determine that the annotation pixels 832 fully surrounds the portion. Otherwise, if there is no portion bounded by the annotation pixels 832, the mark recognizer 735 may determine that the annotation pixels 832 do not fully surround any portion. The mark recognizer 735 may re-apply the kernel with a greater size, and may repeat the determination.

In some embodiments, the mark recognizer 735 may deselect, exclude, or otherwise remove a subset of pixels from the annotation pixels 832. The subset of pixels may correspond to extraneous marks on the slide 806. As discussed above, the extraneous marks may be created with the marker as with the marked indicator 812, and may thus be initially included in the set of annotation pixels 832 based on the threshold ranges. The subset of pixels corresponding to the extraneous marks may be located in the image 802" away from the remainder of the annotation pixels 832 corresponding to the annotation 818. To remove the subset of pixels, the mark recognizer 735 may calculate, determine, or identify groups of annotation pixels 832. Each group may form a contiguous subset of annotation pixels 832. For each subset, the mark recognizer 735 may identify a number of pixels in the group.

With the identification, the mark recognizer 735 may compare the number of pixels to a threshold number for the annotation 818. The threshold number may delineate a value for the number of pixels at which to include or exclude the corresponding subset of pixels from the annotation pixels 832. If the number of pixels is above (e.g., greater than or equal to) the threshold number, the mark recognizer 735 may maintain the inclusion of the corresponding subset of pixels in the annotation pixels 832. Otherwise, if the number of pixels is below (e.g., less than) the threshold number, the mark recognizer 735 may remove the subset of pixels from the annotation pixels 832.

With the identification of the annotation pixels 832, the mark recognizer 735 may output, produce, or otherwise generate at least one marker mask 836. The generation of the marker mask 836 may be based on the image 802". The marker mask 836 may define pixel locations for the annotation pixels 832 on the image 802". The definition of the pixel locations in the marker mask 836 may be in accordance with at least one color value. For example, the marker mask 836 may be bichromatic (e.g., black and white), with one color (e.g., black) corresponding to the annotation pixels 832 and another color (e.g., null or white) corresponding to pixels 814 outside the annotation pixels 832. In some embodiments, the marker mask 836 may be of the same dimensions as the image 802". In some embodiments, the marker mask 836 may be of a different (e.g., less) dimension from the dimension of the image 802". In some embodiments, the mark recognizer 735 may perform the application of the kernel on the annotation pixels 832 in the marker mask 836, instead of the image 802" as discussed above.

In some embodiments, the mark recognizer 735 may use or apply at least one filter on the marker mask 836. The filter may be to denoise, smoothen, or blur the marker mask 836. The filter may be, for example, a denoising function (e.g., total variation denoising or wavelet denoising) or a blur filter (e.g., Gaussian blur, Anisotropic diffusion, or bilateral filter), among others, or any combination thereof. In applying, the image preparer 725 may feed the marker mask 836 into the filter. Due to the filter operation, the noise in the marker mask 836 may be further reduced. As a result of the operation, the definition of the annotation pixels 832 in the marker mask 836 may be more differentiated from the remainder of the marker mask 836. In some embodiments, the mark recognizer 735 may apply the filter to remove pixels from the annotation pixels 832 corresponding to extraneous marks on the slide. In some embodiments, the mark recognizer 735 may store and maintain the marker mask 836 or the annotation pixels 832 on the database 755.

The region finder 740 executing on the image processing system 705 may detect, select, or otherwise identify a set of ROI pixels 838A-N (hereinafter generally referred to as ROI pixels 838) using the annotation pixels 834. The annotation pixels 832 (including the boundary extension 834) may identify pixels bounding the portion of the image 802" corresponding to the ROI 816. Using the annotation pixels 834, the region finder 740 may identify a portion of in the image 802" bounded by the annotation pixels 834. The identified portion may correspond to a different subset of pixels 814 in the image 802". The region finder 740 may assign or use the identified portion from the image 802" as the ROI-marker mask 840. In some embodiments, the region finder 740 may identify a portion of the marker mask 836 bounded by the annotation pixels 832. The region finder 740 may assign or use the identified portion as the ROI pixels 838.

With the identification of the annotation pixels 834, the region finder 740 may output, produce, or otherwise generate at least one ROI-marker mask 840. The ROI-marker mask 840 may pixel locations for the annotation pixels 832 and the ROI pixels 838 in the image 802". The definition of the pixel locations in the marker mask 836 may be in accordance with at least one color value. For example, the ROI-marker mask 836 may be bichromatic (e.g., black and white), with one color (e.g., black) corresponding to the annotation pixels 832 or the ROI pixels 838 and another color (e.g., null or white) corresponding to pixels 814 outside the annotation pixels 832 and the ROI pixels 838. To generate the ROI-marker mask 840, the region finder 740 may include the ROI pixels 838 in the marker mask 836. In some embodiments, the region finder 740 may set or assign color values to pixel locations in the marker mask 836 to indicate the ROI pixels 838 to produce the ROI-marker mask 840. In some embodiments, the ROI-marker mask 840 may be of the same dimensions as the image 802". In some embodiments, the ROI-marker mask 840 may be of a different (e.g., less) dimension from the dimension of the image 802". In some embodiments, the region finder 740 may store and maintain the ROI-marker mask 840, the annotation pixels 834, or the ROI pixels 838 on the database 755.

Using the ROI-marker mask 840, the region finder 740 may output, produce, or otherwise generate at least one ROI mask 842. The ROI mask 842 may pixel locations for the ROI pixels 838 in the image 802". The definition of the pixel locations in the ROI-marker mask 836 may be in accordance with at least one color value. For example, the ROI-marker mask 836 may be bichromatic (e.g., black and white), with one color (e.g., black) corresponding to the ROI pixels 838 and another color (e.g., null or white) corresponding to pixels 814 outside the ROI pixels 838. To generate the ROI mask 842, the region finder 740 may delete, remove, or otherwise extract a boundary in the ROI-marker mask 840. The boundary may correspond to or may be defined by the annotation pixels 834 surrounding the ROI pixels 838. In some embodiments, the region finder 740 may set or assign color values to pixel locations in the ROI-marker mask 840 to remove the annotation pixels 834 to generate the ROI mask 842. In some embodiments, the ROI mask 842 may be of the same dimensions as the image 802". In some embodiments, the ROI mask 842 may be of a different (e.g., less) dimension from the dimension of the image 802". In some embodiments, the region finder 740 may store and maintain the ROI mask 842 or the annotation pixels 834 on the database 755.

Figure 8C:
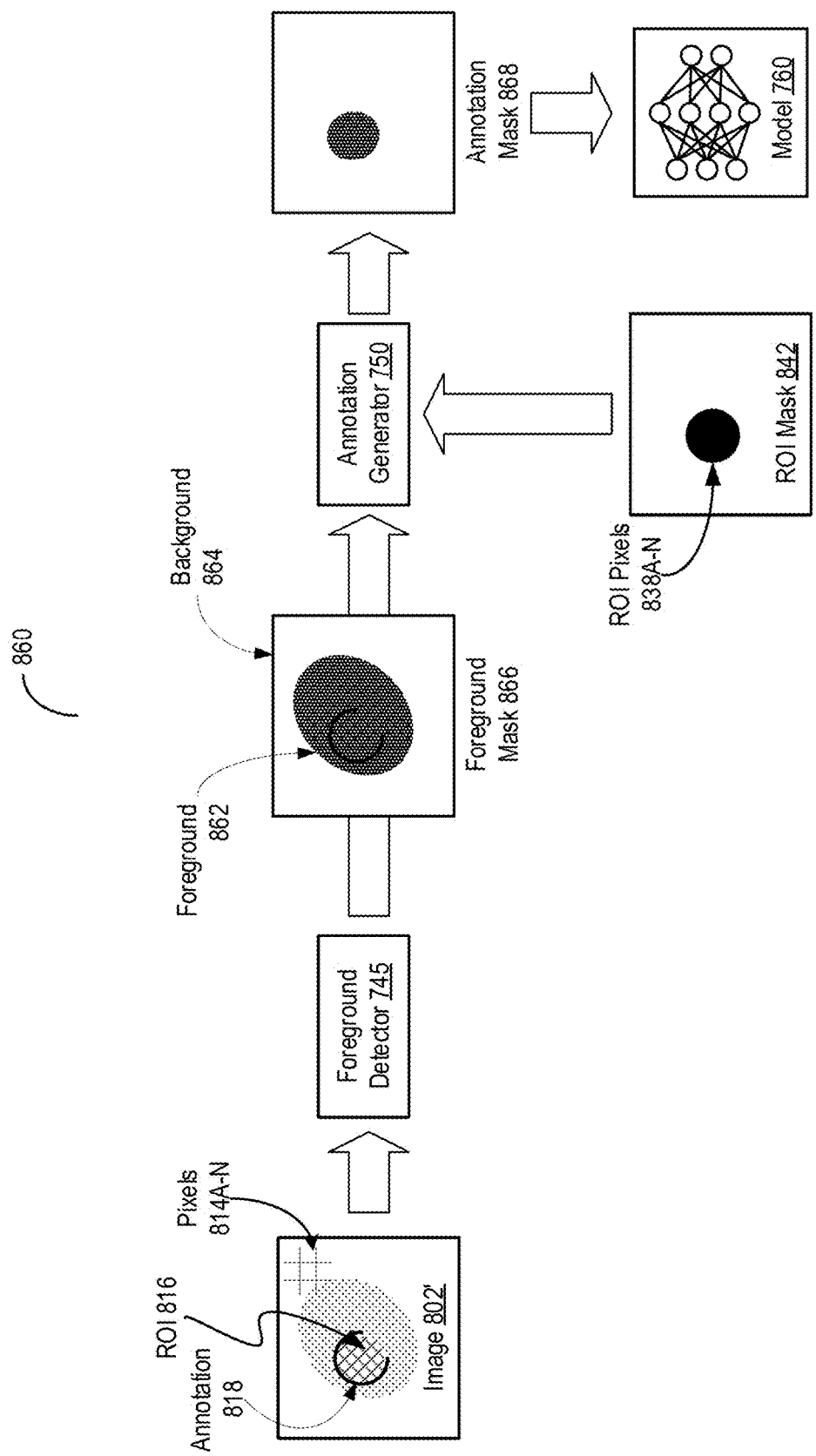
FIG. 8C depicts a block diagram of a process for producing annotation marks in the system for identifying ROIs in accordance with an illustrative embodiment.

Referring now to FIG. 8C, among others, depicted is a block diagram of a process 860 for producing annotation marks in the system 700 for identifying ROIs. The process 860 may correspond to operations performed in the system 700 to provide an identification of the annotation 818. Under the process 860, the foreground detector 745 executing on the image processing system 705 may detect, determine, or otherwise identify at least one foreground 862 from the image 802'. The foreground 862 may generally correspond to one or more portions of the image 802' corresponding to the tissue section 808, the feature 810, and the marked indicator 812 in the sample 804. In some embodiments, the foreground detector 745 may detect, determine, or otherwise identify at least one background 864 from the image 802'. The background 864 may correspond to portions of the image 802' outside of the foreground 862, such as portions outside the tissue section 808, the feature 810, and the marked indicator 812 in the sample 804. The identification of the foreground 862 or the background 864 may also be from the image 802 in the original color space or the image 802" in the converted color space.

To identify the foreground 862 or the background 864 (or both), the foreground detector 745 may apply or use an image thresholding operation on the image 802' (or the image 802 or 802"). The thresholding operation can include Otsu's method, a balanced histogram thresholding, or an adaptive thresholding, among others. For example, the foreground detector 745 may use Otsu's method to differentiate pixels 814 corresponding to the foreground 862 from pixels 814 corresponding to the background 864 in the image 802'. For example, Otsu's method can return a single intensity threshold that separate pixels 814 into the foreground 862 and background 864 from the image 802'. This threshold may be determined by minimizing intra-class intensity variance, or equivalently, by maximizing inter-class variance.

With the identification, the foreground detector 745 may output, produce, or otherwise generate at least one foreground mask 866. The foreground mask 866 may define pixel locations for the foreground 862 within the image 802' (or the image 802 or 802"). The definition of the pixel locations in the foreground mask 866 may be in accordance with at least one color value. For example, the foreground mask 866 may be bichromatic (e.g., black and white), with one color (e.g., black) corresponding to the foreground 862 and another color (e.g., null or white) corresponding to pixels 814 outside the background 864 (or not the foreground 862). In some embodiments, the foreground mask 866 may be of the same dimensions as the image 802". In some embodiments, the foreground mask 866 may be of a different (e.g., less) dimension from the dimension of the image 802". In some embodiments, the mark recognizer 735 may perform the application of the filter on the foreground mask 866 to denoise or blur, instead of the image 802 as discussed above.

The annotation generator 750 executing on the image processing system 705 may output, produce, or otherwise generate at least one annotation mask 868 based on the foreground mask 866 and the ROI mask 842. In some embodiments, the annotation generator 750 may generate the annotation mask 868 based on the pixels identified as corresponding to the foreground 862 and the ROI pixels 838. The annotation mask 868 may define pixel locations of the ROI 818 within the image 802 (or the image 802 or 802") and by extension the feature 810 in the tissue section 808 of the sample 804. The annotation mask 868 may include null portions within the feature 810 as reflected in the image 802' that also intersect with the ROI pixels 838. In some embodiments, the annotation generator 750 may combine the foreground mask 866 and the ROI mask 842 to generate the annotation mask 868.

The annotation mask 868 may define pixel locations for the annotation pixels 832 on the image 802". The definition of the pixel locations in the annotation mask 868 may be in accordance with at least one color value. For example, the annotation mask 868 may be bichromatic (e.g., black and white), with one color (e.g., black) corresponding to the intersection of the ROI pixels 838 and the foreground 862 and another color (e.g., null or white) corresponding to pixels 814 outside the ROI pixels 838. In some embodiments, the annotation mask 868 may be of the same dimensions as the image 802". In some embodiments, the annotation mask 868 may be of a different (e.g., less) dimension from the dimension of the image 802".

With the generation, the annotation generator 750 may store and maintain the annotation mask 868 in the database 755, using one or more data structures (e.g., a table, a heap, a linked list, an array, or a tree). In some embodiments, the annotation generator 750 may generate an association between the ROI pixels 838 and the ROI 816 in the image 802. The association may also be among two or more of the ROI pixels 838, the ROI 816, and the annotation mask 868, among others, with the image 802. The association may be among two or more of an identification the sample 808, the slide 806, the tissue section 808, or the feature 810, among others, with the ROI 816, the ROI pixels 838, the image 802, or the annotation mask 868. Upon generation, the annotation generator 750 may store and maintain the association on the database 755 using the data structures. In some embodiments, the annotation generator 750 may store the data structure with the training dataset 760 on the database 755.

In addition, the annotation generator 750 may convey, send, or otherwise provide the annotation mask 868 to the model trainer system 710 to train the model 760. In some embodiments, the annotation generator 750 may provide the identified ROI pixels 838 to the model trainer system 710.

Upon receipt, the model trainer system 710 may train the model 760 to learn to perform image segmentation, image localization, or image classification. The model 760 may be a machine learning (ML) model or an artificial intelligence (AI) algorithm, such as a clustering algorithm (e.g., k-nearest neighbors algorithm, hierarchical clustering, distribution-based clustering), a regression model (e.g., linear regression or logistic regression), support vector machine (SVM), Bayesian model, or an artificial neural network (e.g., convolution neural network (CNN), a generative adversarial network (GAN), recurrent neural network (RNN), or a transformer), among others. In general, the model 760 may have a set of inputs and a set of outputs related to one another via a set of weights. The input may include at least an image, such as the image 802. Based on the type of function carried out by the model 760, the output may include: a segmented image identifying a region of interest (ROI) in the image similar to the ROI 816; an area (e.g., a bounding box) identifying in which the ROI is present in the image; or a classification of the sample from which the image is derived, among others. The model trainer system 710 may use the training dataset 760 together with the annotation mask 868 (or ROI pixels 838) to set, modify, or otherwise update the weights. For example, the model trainer system 710 may calculate a loss metric between the output and the training dataset 760 or the annotation mask 868. Using the loss metric, the model trainer system 710 may update the weights of the model 760.

By using different color spaces and threshold ranges, the image processing system 705 may identify the ROI 816 in the image 802 and produce the annotation masks 868 for the image 802. The identification and production may be a less computationally inexpensive, relative to other computer vision techniques such as edge detection, blob detection, affine invariant feature detection, or models relying on artificial neural networks (ANN) among others. The image processing system 705 may also alleviate from users from having to manually identify annotations 818 or the marked indicator 812 pixel-by-pixel. This may enable a greater number of samples 804 on slides 806 with marked indicators 812 and by extension images 802 to be used in training the models 760 to perform various tasks, thus increasing the performance of such models 760.

Figure 9:
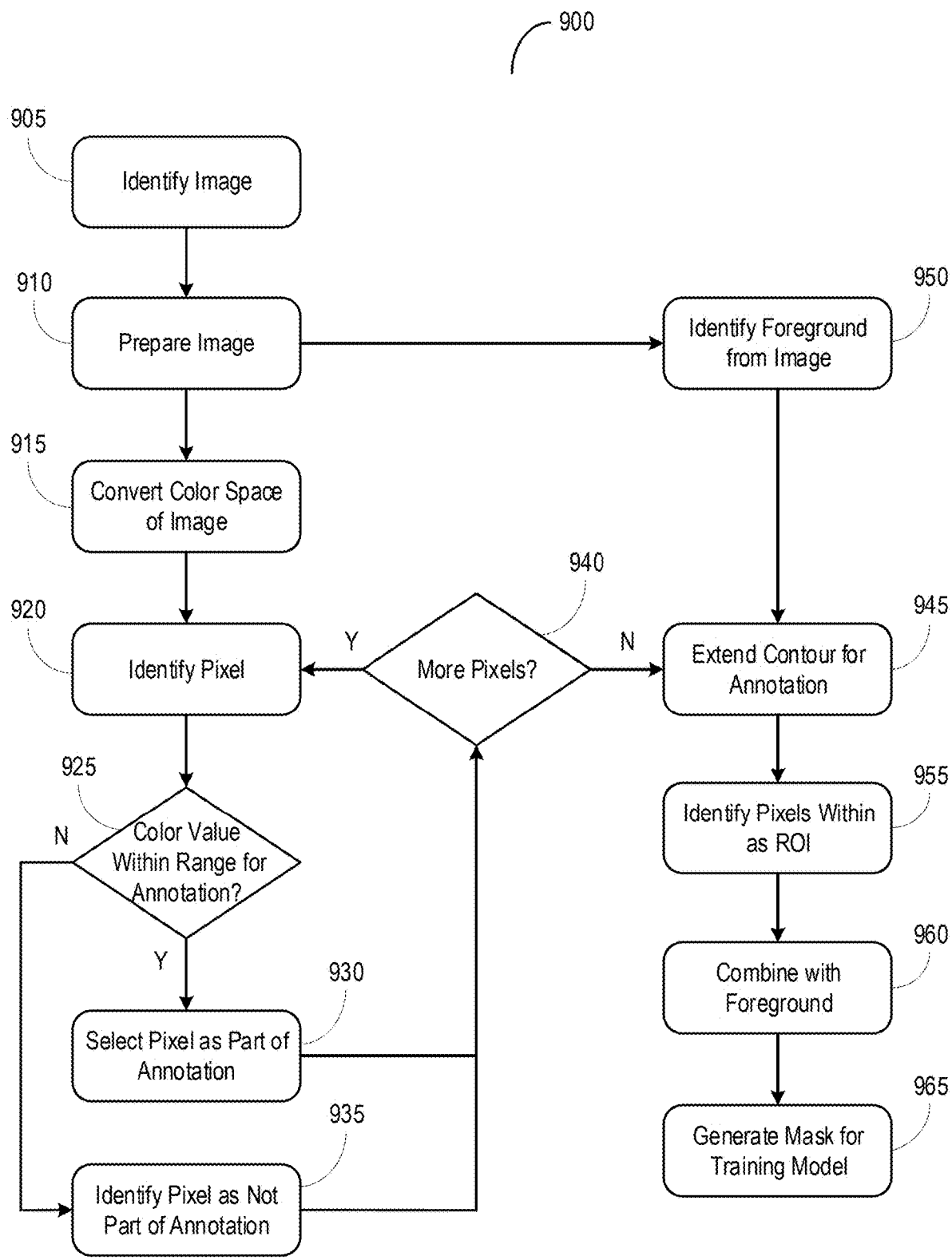
FIG. 9 depicts a flow diagram of a method of identifying regions of interest (ROIs) in images, in accordance with an illustrative embodiment.

Referring now to FIG. 9, depicted is a flow diagram of a method 900 of identifying regions of interest (ROIs) in images. The method 900 may be performed by or implemented using the system 700 described herein in conjunction with FIGS. 7-8C or the system 1000 detailed herein in Section C. Under method 900, a computing system (e.g., the image processing system 705) may identify an image (e.g., the image 802) (905). The computing system may prepare the image (910). The computing system may convert a color space of the image (915). The computing system may identify a pixel (e.g., pixels 814) (920). The computing system may determine whether a color value of the pixel is within a range for an annotation (e.g., the annotation 818) (925). If the color value is within the range, the computing system may select the pixel as part of the annotation (930). Else, if the color value is outside the range, the computing system may identify the pixel not part of the annotation (935).

Continuing on, the computing system may determine whether there are more pixels to examine (940). If there are more, the computing system may repeat the actions (920)—(935). Otherwise, if there are no more pixels, the computing system may extend contour for the annotation (945). The computing system may identify a foreground (e.g., the foreground 864) from the image (950). The computing system may identify pixels within the contour as a region of interest (ROI) (e.g., the ROI 816) (955). The computing system may combine with the foreground (960). The computing system may generate a mask (e.g., the annotation mask 866) for training a model (e.g., the model 760) (965).

C. Computing and Network Environment

Figure 10:
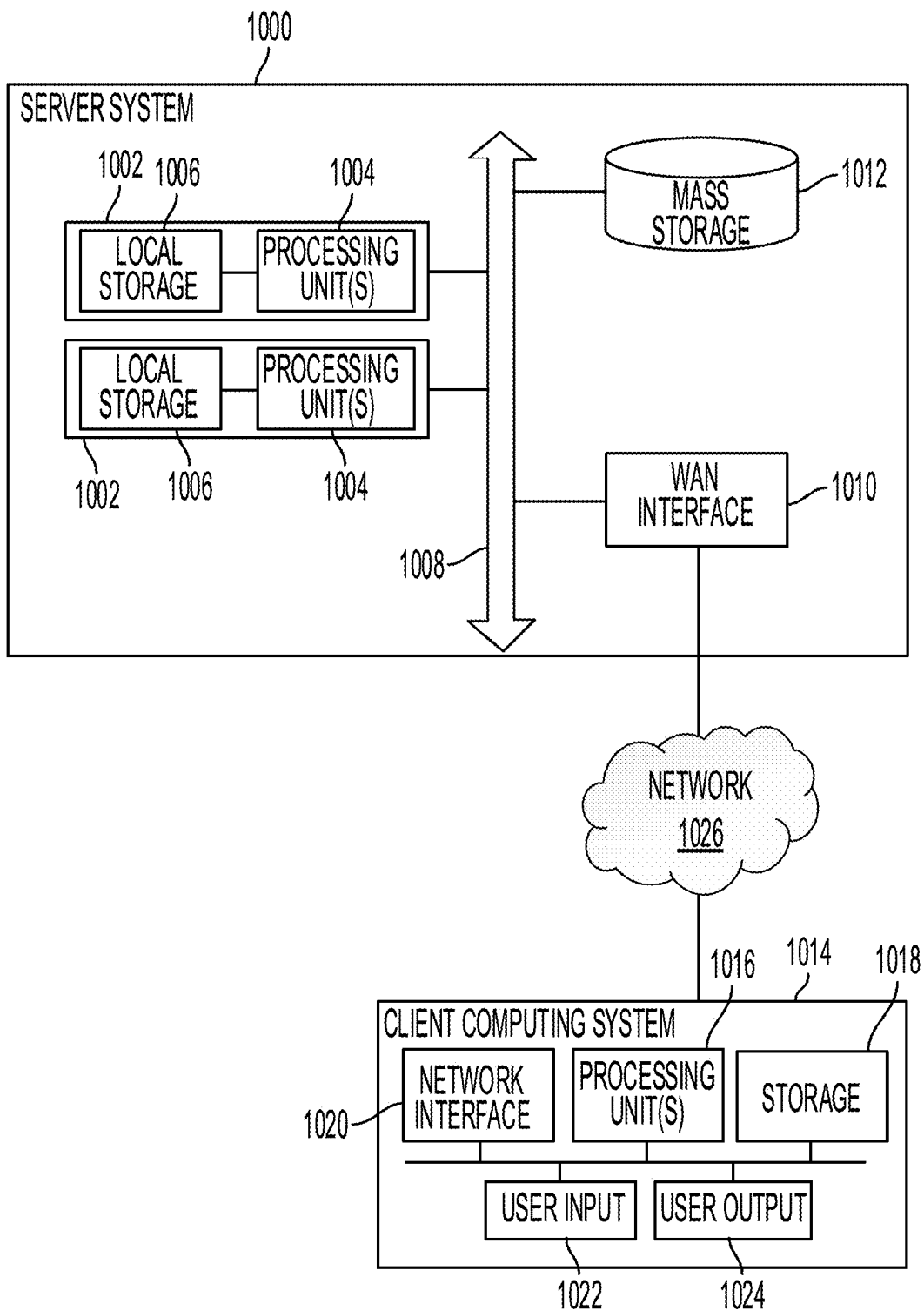
FIG. 10 depicts a block diagram of a server system and a client computer system in accordance with an illustrative embodiment

Various operations described herein can be implemented on computer systems. FIG. 10 shows a simplified block diagram of a representative server system 1000, client computing system 1014, and network 1026 usable to implement certain embodiments of the present disclosure. In various embodiments, server system 1000 or similar systems can implement services or servers described herein or portions thereof. Client computing system 1014 or similar systems can implement clients described herein. The system 600 described herein can be similar to the server system 1000. Server system 1000 can have a modular design that incorporates a number of modules 1002 (e.g., blades in a blade server embodiment); while two modules 1002 are shown, any number can be provided. Each module 1002 can include processing unit(s) 1004 and local storage 1006.

Processing unit(s) 1004 can include a single processor, which can have one or more cores, or multiple processors. In some embodiments, processing unit(s) 1004 can include a general-purpose primary processor as well as one or more special-purpose co-processors such as graphics processors, digital signal processors, or the like. In some embodiments, some or all processing units 1004 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1004 can execute instructions stored in local storage 1006. Any type of processors in any combination can be included in processing unit(s) 1004.

Local storage 1006 can include volatile storage media (e.g., DRAM, SRAM, SDRAM, or the like) and/or non-volatile storage media (e.g., magnetic or optical disk, flash memory, or the like). Storage media incorporated in local storage 1006 can be fixed, removable or upgradeable as desired. Local storage 1006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1004 need at runtime. The ROM can store static data and instructions that are needed by processing unit(s) 1004. The permanent storage device can be a non-volatile read-and-write memory device that can store instructions and data even when module 1002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1006 can store one or more software programs to be executed by processing unit(s) 1004, such as an operating system and/or programs implementing various server functions such as functions of the system 500 of FIG. 5 or any other system described herein, or any other server(s) associated with system 500 or any other system described herein.

"Software" refers generally to sequences of instructions that, when executed by processing unit(s) 1004 cause server system 1000 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1004. Software can be implemented as a single program or a collection of separate programs or program modules that interact as desired. From local storage 1006 (or non-local storage described below), processing unit(s) 1004 can retrieve program instructions to execute and data to process in order to execute various operations described above.

In some server systems 1000, multiple modules 1002 can be interconnected via a bus or other interconnect 1008, forming a local area network that supports communication between modules 1002 and other components of server system 1000. Interconnect 1008 can be implemented using various technologies including server racks, hubs, routers, etc.

A wide area network (WAN) interface 1010 can provide data communication capability between the local area network (interconnect 1008) and the network 1026, such as the Internet. Technologies can be used, including wired (e.g., Ethernet, IEEE 1002.3 standards) and/or wireless technologies (e.g., Wi-Fi, IEEE 1002.11 standards).

In some embodiments, local storage 1006 is intended to provide working memory for processing unit(s) 1004, providing fast access to programs and/or data to be processed while reducing traffic on interconnect 1008. Storage for larger quantities of data can be provided on the local area network by one or more mass storage subsystems 1012 that can be connected to interconnect 1008. Mass storage subsystem 1012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1012. In some embodiments, additional data storage resources may be accessible via WAN interface 1010 (potentially with increased latency).

Server system 1000 can operate in response to requests received via WAN interface 1010. For example, one of modules 1002 can implement a supervisory function and assign discrete tasks to other modules 1002 in response to received requests. Work allocation techniques can be used. As requests are processed, results can be returned to the requester via WAN interface 1010. Such operation can generally be automated. Further, in some embodiments, WAN interface 1010 can connect multiple server systems 1000 to each other, providing scalable systems capable of managing high volumes of activity. Other techniques for managing server systems and server farms (collections of server systems that cooperate) can be used, including dynamic resource allocation and reallocation.

Server system 1000 can interact with various user-owned or user-operated devices via a wide-area network such as the Internet. An example of a user-operated device is shown in FIG. 10 as client computing system 1014. Client computing system 1014 can be implemented, for example, as a consumer device such as a smartphone, other mobile phone, tablet computer, wearable computing device (e.g., smart watch, eyeglasses), desktop computer, laptop computer, and so on.

For example, client computing system 1014 can communicate via WAN interface 1010. Client computing system 1014 can include computer components such as processing unit(s) 1016, storage device 1018, network interface 1020, user input device 1022, and user output device 1024. Client computing system 1014 can be a computing device implemented in a variety of form factors, such as a desktop computer, laptop computer, tablet computer, smartphone, other mobile computing device, wearable computing device, or the like.

Processing unit(s) 1016 and storage device 1018 can be similar to processing unit(s) 1004 and local storage 1006 described above. Suitable devices can be selected based on the demands to be placed on client computing system 1014; for example, client computing system 1014 can be implemented as a "thin" client with limited processing capability or as a high-powered computing device. Client computing system 1014 can be provisioned with program code executable by processing unit(s) 1016 to enable various interactions with server system 1000.

Network interface 1020 can provide a connection to the network 1026, such as a wide area network (e.g., the Internet) to which WAN interface 1010 of server system 1000 is also connected. In various embodiments, network interface 1020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1022 can include any device (or devices) via which a user can provide signals to client computing system 1014; client computing system 1014 can interpret the signals as indicative of particular user requests or information. In various embodiments, user input device 1022 can include any or all of a keyboard, touch pad, touch screen, mouse or other pointing device, scroll wheel, click wheel, dial, button, switch, keypad, microphone, and so on.

User output device 1024 can include any device via which client computing system 1014 can provide information to a user. For example, user output device 1024 can include a display to display images generated by or delivered to client computing system 1014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1024 can be provided in addition to or instead of a display. Examples include indicator lights, speakers, tactile "display" devices, printers, and so on.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1004 and 1016 can provide various functionality for server system 1000 and client computing system 1014, including any of the functionality described herein as being performed by a server or client, or other functionality.

It will be appreciated that server system 1000 and client computing system 1014 are illustrative and that variations and modifications are possible. Computer systems used in connection with embodiments of the present disclosure can have other capabilities not specifically described here. Further, while server system 1000 and client computing system 1014 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to the specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer-readable storage media; suitable media include magnetic disk or tape, optical storage media such as compact disk (CD) or DVD (digital versatile disk), flash memory, and other non-transitory media. Computer-readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A computer-implemented method of identifying regions of interest (ROIs) in images, comprising:
    identifying an image of a tissue sample on a slide, wherein the image includes an annotation corresponding to an indicator on the slide that is at least partially surrounding a feature of the tissue sample, wherein the annotation was formed on the slide prior to the slide being imaged to obtain the image of the tissue sample on the slide, wherein the annotation identifies a region of interest ("ROI") corresponding to the feature of the tissue sample, and wherein the image has a plurality of pixels in a first color space;
    converting the plurality of pixels from the first color space to a second color space to increase color differences between first color values associated with the annotation from second color values associated with the ROI;
    selecting a first subset of pixels of the plurality of pixels based on at least one of the first subset of pixels having a color value in the second color space, wherein the first subset of pixels corresponds to the annotation;
    identifying a second subset of pixels included in the ROI using the first subset of pixels;
    determining whether the first subset of pixels only partially bounds the ROI; and
    upon determining that the first subset of pixels only partially surrounds the ROI, generating a boundary extension so that the first subset of pixels and the boundary extension fully surround the ROI, wherein generating the boundary extension includes applying a kernel, wherein the kernel defines that a color value of a pixel of the first subset of pixels is to be assigned to a number of adjacent pixels of the plurality of pixels of the image, wherein the adjacent pixels are outside of the first subset of pixels.

2. The method of claim 1, wherein the indicator on the slide is a manual label created by a writing instrument.

3. The method of claim 1, further comprising using an association between the second subset of pixels and the ROI to train a machine learning model for at least one of image segmentation, image localization, or image classification.

4. The method of claim 1, further comprising generating a mask defining for the ROI within the image based at least on the second subset of pixels and a foreground portion identified from the image.

5. The method of claim 1, further comprising applying a kernel to a third subset of pixels partially surrounding a fourth subset of pixels and corresponding to the annotation to select the first subset of pixels fully surrounding the fourth subset of pixels corresponding to the ROI.

6. The method of claim 1, further comprising determining, that a third subset of pixels is to be removed from identification based a number of pixels in the third subset of pixels falling below a threshold number of pixels for the annotation.

7. The method of claim 1, further comprising applying a filter to the image including the plurality of pixels in the first color space to reduce noise or differentiate a foreground portion from a background portion of the image.

8. The method of claim 1, wherein selecting the first subset of pixels further comprises determining that the color value of at least one of the first subset of pixels in the second color space satisfies a threshold range of a plurality of threshold ranges, each threshold range of the plurality of threshold ranges for a corresponding color of the indicator.

9. The method of claim 1, wherein identifying the second subset of pixels further comprises extracting a boundary defined by the first subset of pixels to identify the second subset of pixels surrounded by the first subset of pixels.

10. The method of claim 1, further comprising applying a blur filter on the image to reduce noise in the image prior to converting the plurality of pixels from the first color space to a second color space.

11. The method of claim 1, further comprising if there is no portion bounded by the annotation, re-applying the kernel with a greater size.

12. A system for identifying regions of interest (ROIs) in images, the system comprising:
    at least one data storage device storing instructions for determining blood flow deviation in a patient's vasculature; and
    at least one processor configured to execute the instructions to perform operations including:
        identifying an image of a tissue sample on a slide, wherein the image includes an annotation corresponding to an indicator on the slide that is at least partially surrounding a feature of the tissue sample, wherein the annotation was formed on the slide prior to the slide being imaged to obtain the image of the tissue sample on the slide, wherein the annotation identifies a region of interest ("ROI") corresponding to the feature of the tissue sample, and wherein the image has a plurality of pixels in a first color space;
        converting the plurality of pixels from the first color space to a second color space to increase color differences between first color values associated with the annotation from second color values associated with the ROI;
        selecting a first subset of pixels of the plurality of pixels based on at least one of the first subset of pixels having a color value in the second color space, wherein the first subset of pixels corresponds to the annotation;
    identifying a second subset of pixels included in the ROI using the first subset of pixels;
    determining whether the first subset of pixels only partially bounds the ROI; and
    upon determining that the first subset of pixels only partially surrounds the ROI, generating a boundary extension so that the first subset of pixels and the boundary extension fully surround the ROI, wherein generating the boundary extension includes applying a kernel, wherein the kernel defines that a color value of a pixel of the first subset of pixels is to be assigned to a number of adjacent pixels of the plurality of pixels of the image, wherein the adjacent pixels are outside of the first subset of pixels.

13. The system of claim 12, wherein the indicator on the slide is a manual label created by a writing instrument.

14. The system of claim 12, the operations further comprising using an association between the second subset of pixels and the ROI to train a machine learning model for at least one of image segmentation, image localization, or image classification.

15. The system of claim 12, the operations further comprising generating a mask defining for the ROI within the image based at least on the second subset of pixels and a foreground portion identified from the image.

16. A non-transitory computer readable medium for use on a computer system containing computer-executable programming instructions for performing operations determining blood flow deviation in a patient's vasculature, the operations comprising:

identifying an image of a tissue sample on a slide, wherein the image includes an annotation corresponding to an indicator on the slide that is at least partially surrounding a feature of the tissue sample, wherein the annotation was formed on the slide prior to the slide being imaged to obtain the image of the tissue sample on the slide, wherein the annotation identifies a region of interest ("ROI") corresponding to the feature of the tissue sample, and wherein the image has a plurality of pixels in a first color space;

converting the plurality of pixels from the first color space to a second color space to increase color differences between first color values associated with the annotation from second color values associated with the ROI;

selecting a first subset of pixels of the plurality of pixels based on at least one of the first subset of pixels having a color value in the second color space, wherein the first subset of pixels corresponds to the annotation;

identifying a second subset of pixels included in the ROI using the first subset of pixels;

determining whether the first subset of pixels only partially bounds the ROI; and upon determining that the first subset of pixels only partially surrounds the ROI, generating a boundary extension so that the first subset of pixels and the boundary extension fully surround the ROI, wherein generating the boundary extension includes applying a kernel, wherein the kernel defines that a color value of a pixel of the first subset of pixels is to be assigned to a number of adjacent pixels of the plurality of pixels of the image, wherein the adjacent pixels are outside of the first subset of pixels.

17. The non-transitory computer readable medium of claim 16, wherein the indicator on the slide is a manual label created by a writing instrument.

18. The non-transitory computer readable medium of claim 16, the operations further comprising using an association between the second subset of pixels and the ROI to train a machine learning model for at least one of image segmentation, image localization, or image classification.

19. The non-transitory computer readable medium of claim 16, the operations further comprising generating a mask defining for the ROI within the image based at least on the second subset of pixels and a foreground portion identified from the image.

20. The system of claim 12, wherein the operations further comprises if there is no portion bounded by the annotation, re-applying the kernel with a greater size.

* * * * *